United States Patent
Paolini et al.

(10) Patent No.: US 9,013,513 B2
(45) Date of Patent: Apr. 21, 2015

(54) METHODS AND APPARATUS TO NAVIGATE ELECTRONIC DOCUMENTS

(75) Inventors: Stefano Paolini, Georgetown (CA); Michael Patrick McAndrews, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 177 days.

(21) Appl. No.: 13/635,321

(22) PCT Filed: Apr. 12, 2012

(86) PCT No.: PCT/US2012/033298
§ 371 (c)(1),
(2), (4) Date: Sep. 14, 2012

(87) PCT Pub. No.: WO2013/154565
PCT Pub. Date: Oct. 17, 2013

(65) Prior Publication Data
US 2013/0271498 A1    Oct. 17, 2013

(51) Int. Cl.
*G09G 5/00* (2006.01)
*G06F 3/0483* (2013.01)
*G09G 5/14* (2006.01)
*G09G 5/34* (2006.01)
*H04M 1/725* (2006.01)
*G06F 3/0488* (2013.01)

(52) U.S. Cl.
CPC ............. *G06F 3/0483* (2013.01); *G09G 5/14* (2013.01); *G09G 5/346* (2013.01); *H04M 1/72522* (2013.01); *H04M 2250/22* (2013.01); *G06F 3/0488* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 5,712,995 A * | 1/1998 | Cohn | 715/792 |
| 6,005,573 A | 12/1999 | Beyda et al. | |
| 7,006,091 B2 | 2/2006 | Masera et al. | |
| 7,216,291 B2 | 5/2007 | Kim | |
| 7,779,346 B2 | 8/2010 | Buczek | |
| 8,767,030 B2 * | 7/2014 | Singhal | 348/14.01 |
| 2007/0250788 A1 * | 10/2007 | Rigolet | 715/788 |
| 2009/0295787 A1 | 12/2009 | Yao et al. | |
| 2009/0313537 A1 | 12/2009 | Fu et al. | |
| 2010/0013827 A1 | 1/2010 | Fillion et al. | |
| 2010/0081475 A1 * | 4/2010 | Chiang et al. | 455/564 |
| 2010/0248788 A1 * | 9/2010 | Yook et al. | 455/566 |
| 2012/0176322 A1 * | 7/2012 | Karmi et al. | 345/173 |

OTHER PUBLICATIONS

Acrobat Reader X (2011, Using Adobe Acrobat X Standard).*

(Continued)

*Primary Examiner* — Carlos Perromat
*Assistant Examiner* — Xin Sheng
(74) *Attorney, Agent, or Firm* — Fish & Richardson P.C.

(57) ABSTRACT

Example methods and apparatus to navigate electronic documents are disclosed. A disclosed example method involves first and second display portions by a demarcation line, to display first and second content in those display portions, based on receiving an input corresponding to a display coordinate. In an example, the method also includes overlaying an image of the first content portion on the first content portion, and allowing the image of the first content portion to scroll only in directions parallel to demarcation line.

27 Claims, 11 Drawing Sheets

SCROLL-INTENSIVE ELECTRONIC DOCUMENT

(56) References Cited

OTHER PUBLICATIONS

"Adobe Reader x: bookmarks", XP55041558, Aug. 8, 2004 [Retrieved from the Internet: URL:http://www.adobe.comjproductsjreader.html] 1 page.

"Adobe Reader X, cascade option", XP55041622, Aug. 8, 2004 [Retrieved from the Internet:URL:http://www.adobe.com/productsjreader.html] 1 page.

Patent Cooperation Treaty, "International Search Report," issued by the International Searching Authority in connection with PCT application No. PCT/US2012/033298, mailed Oct. 29, 2012, 4 pages.

Patent Cooperation Treaty, "Written Opinion of the International Searching Authority," issued by the International Searching Authority in connection with PCT/US2012/033298, mailed Oct. 29, 2012, 4 pages.

"Documents to Go for iPhone/iPad/iPod Touch Help," DataViz [retrieved from http://www.dataviz.com/handheld/support/documentstogo/iphone/ on Nov. 15, 2011] 24 pages.

"Documents to Go," User Manual for Android, DataViz, Inc., Mar. 2, 2010, 55 pages.

Patent Cooperation Treaty, "International Preliminary Report on Patentability," issued in connection with International Patent Application No. PCT/US2012/033298, on Oct. 14, 2014 (5 pages).

\* cited by examiner

PINCH ZOOM

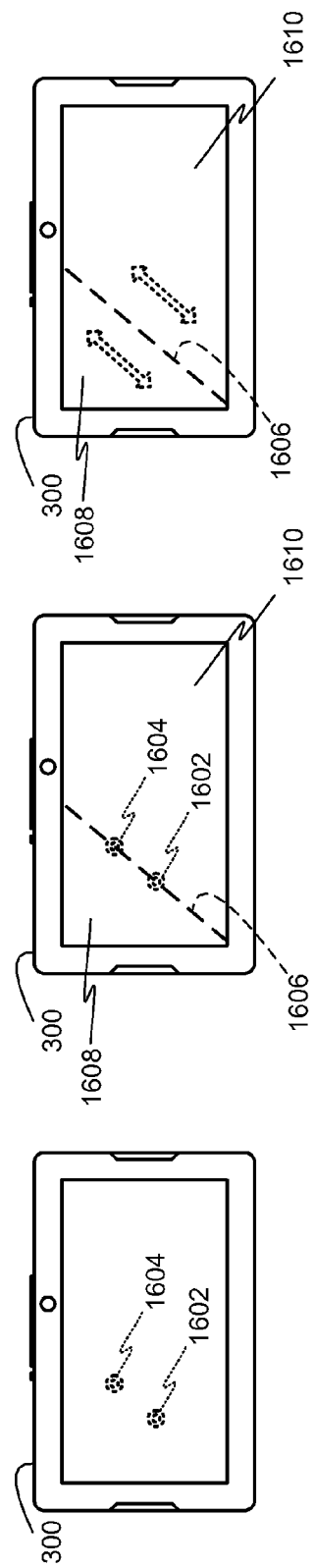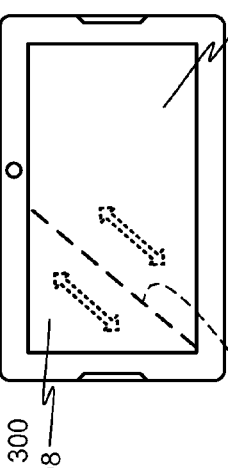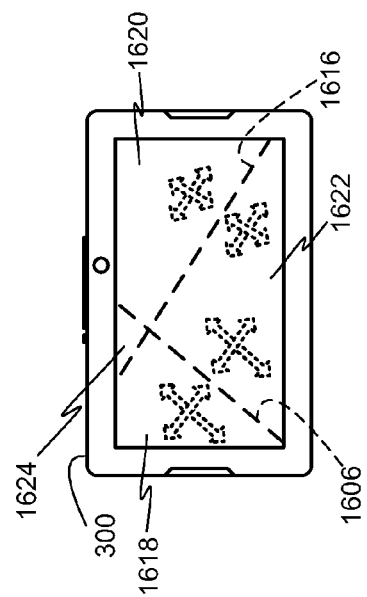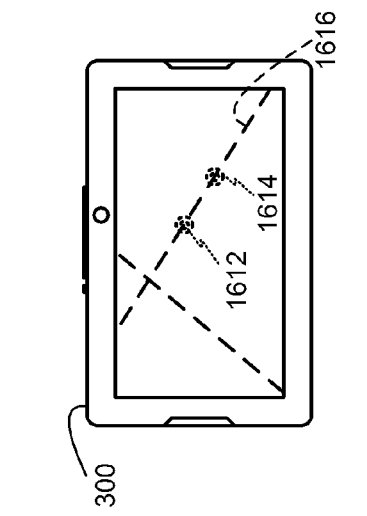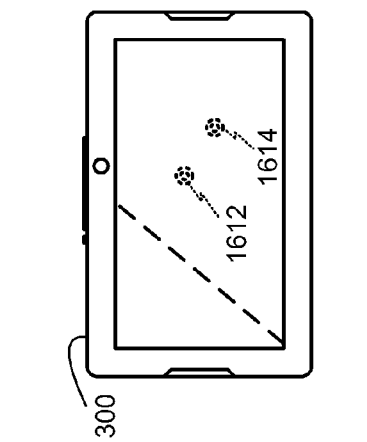

METHODS AND APPARATUS TO NAVIGATE ELECTRONIC DOCUMENTS

RELATED APPLICATION

This is a U.S. national phase application under 35 USC 371 of International Application No. PCT/US2012/033298, filed on Apr. 12, 2012, which is hereby incorporated herein by reference in its entirety.

FIELD OF THE DISCLOSURE

The present disclosure relates generally to electronic devices and, more particularly, to methods and apparatus to navigate electronic documents.

BACKGROUND

Documents, reports, and other types of electronic documents offer large amounts of information for viewing via electronic devices such as computers. Such electronic documents can be in any of a number of file formats such as the portable document format (.pdf), Microsoft® Office PowerPoint® format (.ppt), Microsoft® Office Excel® spread sheet format (.xls), Microsoft® Office Word document format (.doc), hypertext markup language format (.htm, .html), Joint Photographic Experts Group format (.jpeg, .jpg), Portable Network Graphics format (.png), Tagged Image File Format (.tiff), etc. Large screen sizes of laptop computers and/or desktop computers allow users to relatively easily view and interact with such electronic documents even when such documents have large quantities of contents. Some computer applications offer a freeze panes function (e.g., the Microsoft Office Excel spreadsheet application) or a split screen function (e.g., the Microsoft Office Word word processor application) to facilitate viewing documents having layouts larger than is simultaneously displayable on a computer screen. Other applications allow users to zoom-in on content by double-clicking or double-tapping on the displayed content on the display.

BRIEF DESCRIPTION OF THE DRAWINGS

FIGS. 16A-16F depict an example manner of specifying one or more demarcation lines to divide a display into display portions for displaying one or more directionally locked content portions of content.

DETAILED DESCRIPTION

Figure 1:
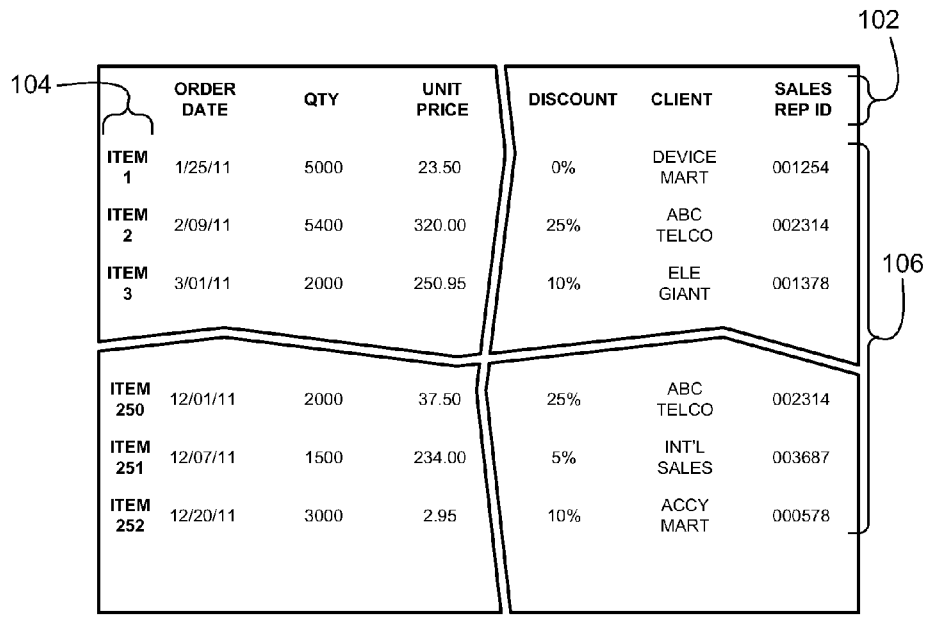
FIG. 1 depicts an example scroll-intensive electronic document that can be navigated using examples disclosed herein.

Although the following discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, apparatus, and articles of manufacture, persons having ordinary skill in the art will readily appreciate that the examples provided are not the only way to implement such methods, apparatus, and articles of manufacture.

It will be appreciated that, for simplicity and clarity of illustration, where considered appropriate, reference numerals may be repeated among the figures to indicate corresponding or analogous elements. In addition, numerous specific details are set forth in order to provide a thorough understanding of example embodiments disclosed herein. However, it will be understood by those of ordinary skill in the art that example embodiments disclosed herein may be practiced without these specific details. In other instances, well-known methods, procedures and components have not been described in detail so as not to obscure example embodiments disclosed herein. Also, the description is not to be considered as limiting the scope of example embodiments disclosed herein.

Example methods, apparatus, and articles of manufacture are disclosed herein in connection with electronic mobile devices, which may be any mobile communication device, mobile computing device, or any other element, entity, device, or service capable of communicating wirelessly. Mobile devices, also referred to as terminals, wireless terminals, mobile stations, communication stations, or user equipment (UE), may include mobile smart phones (e.g., BlackBerry® smart phones), wireless personal digital assistants (PDA), tablets (e.g., the BlackBerry® Playbook tablet device), laptop/notebook/netbook computers with or without wireless adapters, etc.

Example methods, apparatus, and articles of manufacture disclosed herein may be used to facilitate viewing, interaction with, and/or editing electronic documents displayed on electronic devices such as mobile devices having relatively smaller screens than available on larger desktop or laptop computers. Although examples disclosed herein are described in connection with mobile devices, such examples may also be implemented in connection with desktop computers and/or laptop computers.

Some examples disclosed herein facilitate viewing scroll-intensive electronic documents such as spreadsheets or other types of documents having information spread out over a large area (e.g., word processor documents, portable document format (pdf) documents, drawings, images etc. created on large page or canvas sizes). Such scroll-intensive documents often cause users to rely on or employ multiple direction vertical and/or horizontal scrolling to navigate around and view the information in the document. When a user desires to compare first information appearing in a first portion of the document to second information appearing in a second, distal portion of the document, the user either zooms out on the document so that the first and second portions are visible on a device screen, or the user scrolls repeatedly between the first portion and the second, distal portion to compare the information. Zooming out of the document may be unacceptable when text font becomes too small to read, and thus, repeated back and forth scrolling is often used. However, such repeated back and forth scrolling can cause a user to quickly lose context of the separately located information being scrolled between since the user relies on her/his memory to remember the organization and meaning of the content at the different locations.

Challenges associated with viewing such scroll-intensive documents become even more apparent when working on smaller displays (e.g., 4-inch, 7-inch or 10-inch displays) such as displays of tablet devices or other mobile devices, as the content in a scroll-intensive document typically has an area larger than the display of the device. Some examples disclosed herein facilitate navigating scroll-intensive documents by allowing users to directionally lock certain content portions (i.e. allow certain content portions to scroll only in certain directions such as parallel to a line of demarcation), while allowing other content portions to scroll in multiple directions. For example, techniques disclosed herein allow a user to specify one or more content portions (e.g., one or more of a left-hand-side portion, a top portion, a right-hand-side portion, and/or a bottom portion) of content of an electronic document that are to be directionally locked. In this manner, the user can compare first information contained in the directionally locked content portion(s) of the content with second information contained at a distal location in the scrollable or moveable portion(s) of the electronic document by scrolling the scrollable or moveable portion(s) relative to the directionally locked portion(s) until the first and second information are simultaneously displayed/viewable on an electronic device screen. Such example techniques are useable with many types of documents including legacy document reports that cannot be easily modified, re-formatted, or reorganized for viewing on small screens such as tablet device or mobile device screens. In this manner, examples disclosed herein increase navigability, usability, and viewability of large-page-size documents on devices such as tablet computers or other mobile devices having relatively smaller screen sizes. This in turn saves on expenses and time for users and organizations that would otherwise be needed to re-write, re-organize, re-build, or re-format existing electronic documents. In addition, examples disclosed herein are useable to enable users and organizations to more quickly adopt use of smaller-screen devices (e.g., screens of tablet devices or mobile devices) because existing or legacy electronic documents can be readily viewed and used without needing to re-write, re-organize, re-build, or re-format such existing electronic documents before using them on the smaller-screen devices.

Some examples disclosed herein to navigate content (such as content in scroll-intensive documents) displayed on a display involve the method of dividing the display into first and second display portions along a demarcation line, dividing the content into first and second content portions, displaying at least part of the first content portion in the first display portion, displaying at least part of the second content portion in the second display potion, after receiving a first scrolling input, controlling scrolling of the first content portion to allow scrolling only in directions parallel to the demarcation line, and controlling scrolling of the second portion to allow scrolling in multiple directions. In some examples, instead of controlling scrolling of the second portion to allow scrolling in any direction, the scrolling of the second portion is controlled to allow scrolling only in directions parallel to the demarcation line and in directions orthogonal to the demarcation line. In some examples, the method includes receiving a divide input to divide the display. In some examples, the divide input is a tap on the display by a user and received through a touch screen display or a click input by a user and received through a user-navigation pointer input device. The first content portion can correspond to content portions at one or more of to the left, to the right, above, and/or below the display coordinate corresponding to the divide input. In some examples, the display coordinate corresponding to the divide input is defined independent of features of the content. In such some examples, the display coordinate is not defined based on, for example, cells of a spreadsheet or other feature demarcations (e.g., text, graphics, rows, columns, page breaks, section breaks, etc.) native to an electronic document or based on graphical cues or graphical control elements (e.g., a document split bar) native to an application rendering the electronic document.

In some examples, the content is generated by one or more applications and the methods disclosed herein for example, dividing a display into display portions, dividing the content into content portions and controlling scrolling, are performed outside of the application(s) functions and are implemented in one or more operating system functions. In this manner, techniques or features to divide a display into display portions can be application-independent such that they can be used across different applications. In such examples, an operating system function is employed to divide a display into first and second display portions based on a divide input by a user and received through an input device (such as for example a touch screen display). In other examples, methods for dividing a display into display portions are implemented in add-on or plug-in modules that can be added to different applications. In yet other examples, methods for dividing a display into display portions can be implemented directly in applications.

Some examples disclosed herein facilitate viewing contents of border-intensive electronic documents using feature recognition and auto-zoom techniques. Such border-intensive electronic documents can be pages or sheets of presentations (e.g., PowerPoint presentations) or other documents in which border portions or margins consume portions of the pages such that displaying a page in its entirety on a device screen results in the contents of the page being smaller than desired for comfortable or legible viewing. That is, when an application uses known techniques to display a page of an electronic document having relatively large-size borders or margins without content (e.g., blank space) or with content that is deemed of relatively little or no interest (e.g., non-essential content, non-interest content, non-significant content, etc.) to a user, is filled with such borders or margins are displayed on a device screen regardless of their little or no significance to a user. That is, the application displays the margins or borders even though the margins or borders are of little or no interest relative to other, more interesting content concentrated toward a center of the displayed page. In known techniques for displaying such margins or borders, the relatively more interesting content located at or about a central portion of the page is displayed at a smaller size (e.g., zoomed out) so that the application can fit the entire page (including content or blank space at border locations) on a device screen. To view a larger rendering (e.g., a zoomed in rendering) of the content of interest in connection with such known document display techniques, a user manually zooms in on and center the content of interest on the device screen. When the user turns to (e.g., advances to) a different page, the user again manually zooms in on and center the content of interest in the turned-to page to render a larger view of the content of interest without displaying the margins or borders that are of relatively less or no interest to the user.

Challenges associated with viewing such border-intensive documents become even more apparent when working on smaller displays (e.g., 7-inch or 10-inch displays) such as displays of tablet devices or other mobile devices. Examples disclosed herein facilitate maximizing views of relatively more interesting contents of border-intensive electronic documents without using up display space for displaying borders or margins (and any content therein) that is of relatively less or no interest for viewing by a user on, for example, smaller displays of mobile devices. Some disclosed examples analyze one or more pages of an electronic document to identify features, display elements, or common parts (e.g., headers, sub-headers, footers, unused blank space) that are deemed of little or no value (e.g., have relatively less or no meaning or relevance compared to other more meaningful content on a page) for displaying. In some examples, a user is provided with a selectable option to suppress displaying of the detected features, display elements, or common parts and to zoom in on content deemed to be of relatively more interest for display and viewing by the user. Such example auto-zoom techniques are useable with many types of documents including legacy documents that cannot be easily modified or reorganized for viewing on small displays such as tablet device or mobile device displays. In this manner, examples disclosed herein increase navigability, usability, and viewability of border-intensive electronic documents on devices such as tablet computers or other mobile devices having relatively smaller display sizes.

Some examples disclosed herein to auto-zoom and selectively display content of border-intensive documents involve identifying first and second content portions in a multiple-page document. In such examples, the first content portions contain first content not to be displayed and the second content portions contain second content to be displayed. During displaying of each page of the multiple-page document, such examples automatically zoom into the page to enlarge the second content of the page to fill a viewable display area and to exclude the first content from the viewable display area. In some examples, the identifying of the first content portions involves detecting features in different pages of the multiple-page document that match one another. In some examples, the features include at least one of text or graphics corresponding to a template used to create the multiple-page document. In some examples, the identifying of the first content portions involves detecting blank spaces occurring at the same on-page locations (e.g., a location at one or more content portions of a page) in different pages of the multiple-page document. In some examples, the first content portions are margins of the multi-page document.

In some examples, the content is generated by one or more applications and the methods disclosed herein for example, selectively displaying content of border-intensive documents, are performed outside of the application(s) functions and are implemented in one or more operating system functions. In this manner, techniques or features to identify and display selective content of border-intensive documents can be application-independent such that they can be used across different applications. In such examples, an operating system function is employed to identify the first and second content portions, and to zoom into the page to display the second content portions while excluding the first content portions from being displayed. The operating system function can be similarly used across different applications to selectively display content of relatively more interest while excluding or suppressing the display of other content of relatively little or no interest. In other examples, methods for selectively zooming in on and display content across different applications are implemented in add-on or plug-in modules that can be added to different applications. In yet other examples, methods for selectively zooming in on and displaying content can be implemented directly in applications.

Examples disclosed herein are useable to enable users and organizations to continue using existing electronic documents (e.g., legacy documents or reports) on smaller-display devices (e.g., displays of tablet devices or mobile devices) without needing to re-write, re-organize, re-build, or re-format such existing electronic documents. This in turn saves on expenses and time for such users and organizations. In addition, examples disclosed herein are useable to enable users and organizations to more quickly adopt use of smaller-display devices (e.g., displays of tablet devices or mobile devices) because existing or legacy electronic documents can be readily viewed and used without needing to re-write, re-organize, re-build, or re-format such existing electronic documents before using them on the smaller-display devices.

FIG. 1 depicts an example scroll-intensive electronic document 100 that can be navigated using examples disclosed herein. The scroll-intensive electronic document 100 of the illustrated example is arranged as a spreadsheet having column labels 102 and row labels 104 that specify the meaning or type of information 106 of the scroll-intensive electronic document 100. In the illustrated example of FIG. 1, only four portions or quadrants of the scroll-intensive electronic document 100 are shown. That is, information between the four portions of the scroll-intensive electronic document 100 is not shown in FIG. 1. Although not shown in its entirety, the scroll-intensive electronic document 100 of the illustrated example has a relatively large area that cannot be displayed in its entirety on a relatively small electronic device display (e.g., a tablet device display or a mobile device display) while showing the information 106 in a legible manner. Examples disclosed herein facilitate using electronic devices with relatively small displays to view scroll-intensive electronic documents such as the scroll-intensive electronic document 100 or other types of documents having information spread out over a large area. As discussed in greater detail below in connection with FIGS. 3-7, some disclosed examples allow users to specify content portion(s) of a displayed document that are to be directionally locked in certain directions, while other content portions of the displayed document remain scrollable in all directions. Using such examples disclosed herein, a user can comparatively view separately located information of the scroll-intensive electronic document 100 of FIG. 1 in a sideby-side manner by directionally locking a first content portion of the electronic document 100 and multiple direction scrolling a non-directionally locked content portion of the electronic document 100 to arrange a second content portion of the electronic document 100 adjacent to the directionally locked first content portion. In this manner, two content portions of the electronic document 100 that are of interest to the user are displayed simultaneously on a display of an electronic device in a legible manner.

Figure 2:
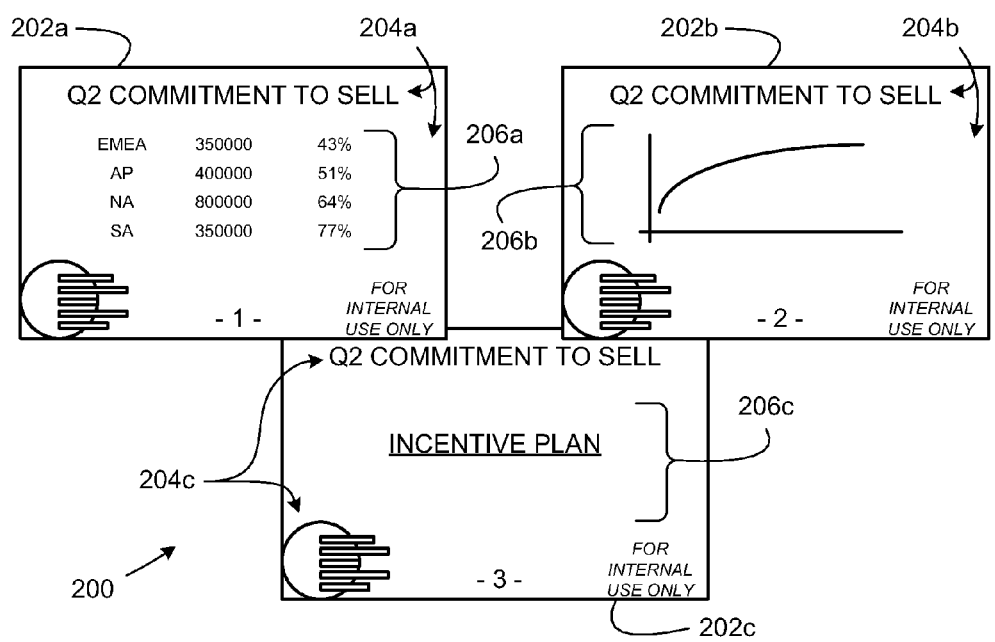
FIG. 2 depicts an example border-intensive electronic document that can be navigated using examples disclosed herein.

FIG. 2 depicts an example border-intensive electronic document 200 that can be navigated using examples disclosed herein. The border-intensive electronic document 200 of the illustrated example is a multi-page presentation created from a template that locates common features or similar features on each page 202a-c. In the illustrated example, common or similar features are repeated at borders or margins 204a-c of each page of the border-intensive electronic document 200. The common or similar features of the illustrated example include a title, a logo, page numbering, disclaimer text, and blank space. In the illustrated example, the title is located at a header content portion; the logo, the page numbering, and the disclaimer text are located at a footer; and blank space is located at right-side and left-side margins of the border-intensive electronic document 200. In other examples, common or similar features are additionally or alternatively located in other arrangements. Each page 202a-c of the illustrated example contains per-page content 206a-c that is deemed of relatively more interest to users than the repeated common features located at the borders 204a-c. However, known techniques for displaying electronic documents such as the border-intensive electronic document 200 display each page 202a-c in its entirety including the borders 204a-c and the per-page content 206a-c. Such known display techniques result in the per-page content 206a-c being more difficult to review and analyze by users due to, for example, clutter and/or a higher zoom-out level. As discussed in more detail below in connection with FIGS. 8-10, examples disclosed herein facilitate viewing contents of border-intensive electronic documents such as the per-page contents 206a-c of the border-intensive electronic document 200 in a manner that automatically identifies more suitable views for enlarging or zooming in on the per-page contents 206a-c so that the per-page contents 206a-c are displayed in a relatively more legible manner on an electronic device. That is, examples disclosed herein use an example auto-zoom mode to automatically identify features (e.g., the common features of the borders 204a-c in FIG. 2) that are deemed less relevant or non-essential for display and automatically identify enlarged or zoomed-in levels useable to display more relevant information of pages on displays of electronic devices.

Figure 3:
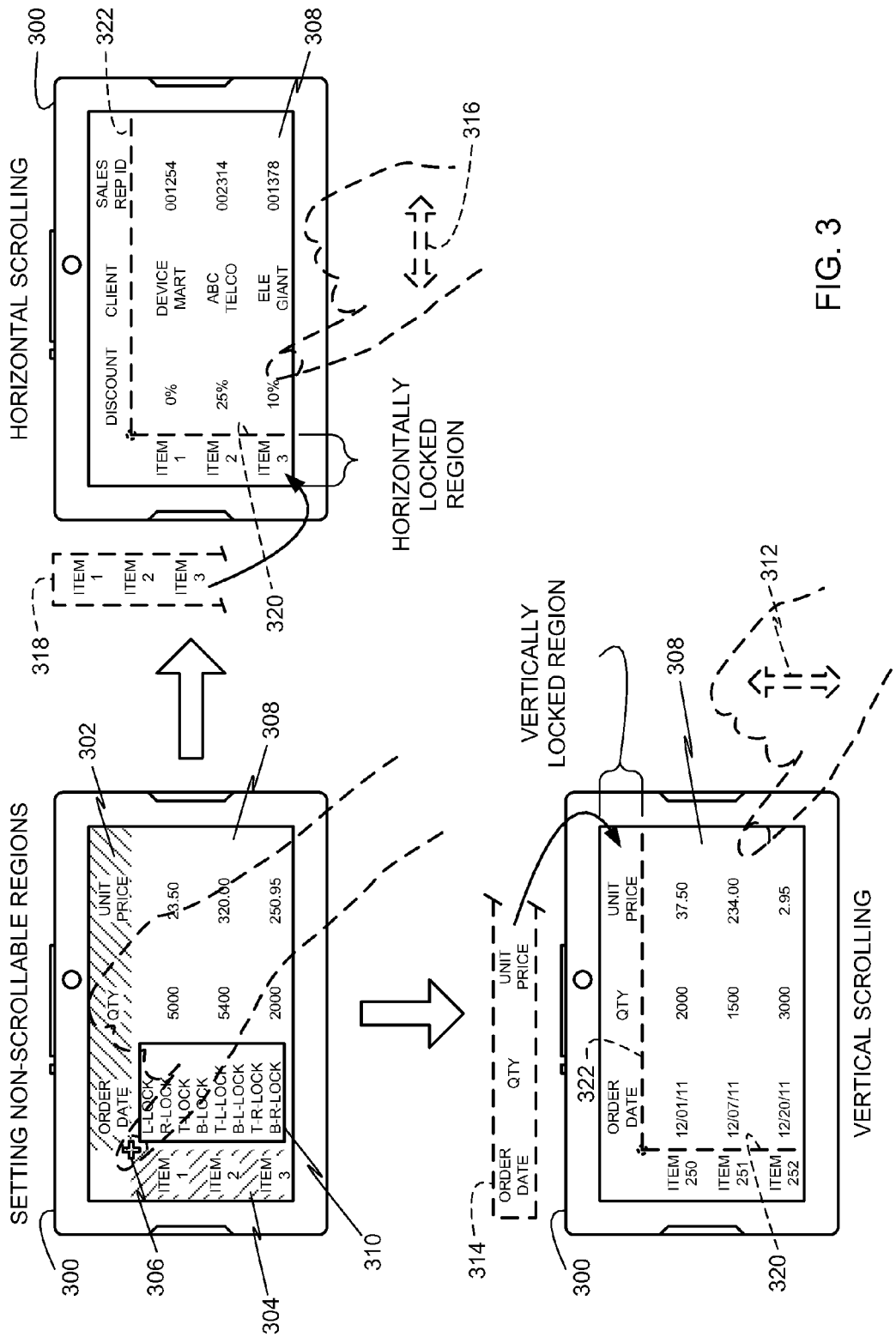
FIG. 3 depicts the example scroll-intensive electronic document of FIG. 1 displayed on a mobile device and navigable using examples disclosed herein.
Figure 5:
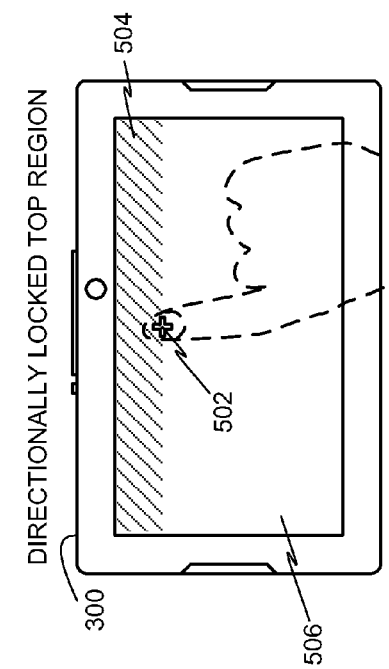
FIGS. 4-7 depict different user-specified directionally locked content portions in connection with the example scroll-intensive electronic document of FIG. 1 displayed on the mobile device of FIG. 3.

FIG. 3 depicts the example scroll-intensive electronic document 100 of FIG. 1 displayed on a mobile device 300 and navigable using examples disclosed herein. In the illustrated example, the mobile device 300 displays a portion of the scroll-intensive electronic document 100 on its display. Scroll-intensive electronic document 100 includes the content portions: top-side content portion 302 containing the column labels 102, left-side content portion 304 containing the row labels 104, and content portion 308. In the illustrated example of FIG. 3, a user desires to view contents of the scroll-intensive electronic document 100 relative to the column labels 102 (FIG. 1) and the row labels 104 (FIG. 1). To divide the display into display portions, and directionally lock certain content portions displayed within those display portions, the user a user taps on the display (e.g., a touch screen display) of the mobile device 300 at a demarcation point 306 which defines demarcation lines 322 and 320. One display portion displays at least part of top-side content portion 302, another display portion displays at least part of left-side content portion 304, and another display portion displays at least part of content portion 308. Demarcation lines 322 and 320 respectively separate content portion 308 of the scroll-intensive electronic document 100 from the top-side content portion 302, and separate the content portion 308 from the left-side content portion 304. As the top-side content portion 302 is directionally locked, the scrolling of top-side content portion 302 is controlled to allow scrolling only in directions parallel to demarcation line 322 (after receiving a scrolling input). Furthermore, as the left-side content portion 302 is directionally locked, the scrolling of the scrolling of left-side content portion 302 is controlled to allow scrolling only in directions parallel to demarcation line 320 (after receiving a scrolling input). In the illustrated example, the mobile device 300 includes a touch screen display that can accept divide inputs via touch or gestures applied by users on its display. However, divide inputs by users to specify the demarcation point 306 may be provided via any other input device (e.g., a mouse pointer, a touch pad, buttons, a keyboard, a microphone, etc.).

In the illustrated example, the mobile device 300 associates the demarcation point 306 with a display coordinate (e.g., an X-Y coordinate) that specifies demarcation lines 322 and 320 at which directionally locked content portion(s) (e.g., the top-side content portion 302 and the left-side content portion 304) are adjacent to scrollable portion(s) (e.g., the content portion 308) of the scroll-intensive electronic document 100. The mobile device 300 of the illustrated example is not constrained to determining the display coordinate associated with the demarcation point 306 based on features (e.g., graphical elements, spreadsheet cells, text, graphics, rows, columns, page breaks, section breaks, etc.) of the electronic document 100 or based on graphical cues or graphical control elements (e.g., a document split bar) of an application rendering the electronic document. Instead, the mobile device 300 of the illustrated example determines the display coordinate of the demarcation point 306 based on where the user taps on the display or where the user selects that the demarcation point 306 should be on the display. In this manner, the user is not bound to features of the electronic document 100 to select a location of the demarcation point 306, and the examples disclosed herein can be used with any type of electronic document even if some electronic documents do not contain features (e.g., spreadsheet cells, rows, columns, etc.) that facilitate directionally locking some content portions relative to other scrollable content portions. In the illustrated example of FIG. 3, shaded portions and phantom lines are shown for illustration and ease of discussion to distinguish the top-side content portion 302 and the left-side content portion 304 from the scrollable content portion 308. However, these shaded portions and phantom lines need not be shown in implementations of the lock techniques.

In the illustrated example, to divide the display into display portions, for displaying content portions, and select which of the content portions (e.g., the top-side content portion 302 and the left-side content portion 304) that are to be directionally locked, the mobile device 300 displays a lock menu 310 in response to the user selecting the demarcation point 306. The lock menu 310 of the illustrated example provides numerous user-selectable options to specify which of the content portions are to remain directionally locked. Example content portions shown in the lock menu 310 include a left-lock (L-LOCK) content portion which directionally locks a content portion to the left of the demarcation point 306 such as the left-side content portion 304, a right-lock (R-LOCK)

content portion which directionally locks a content portion to the right of the demarcation point 306, a top-lock (T-LOCK) content portion which directionally locks a content portion to the top of the demarcation point 306, a bottom-lock (B-LOCK) content portion which directionally locks a content portion to the bottom of the demarcation point 306, a top-left-lock (T-L-LOCK) content portion which directionally locks content portions to the top and left of the demarcation point, a bottom-left-lock (B-L-LOCK) content portion which directionally locks content portions to the bottom and left of the demarcation point 306, a top-right-lock (T-R-LOCK) content portion which directionally locks content portions to the top and right of the demarcation point 306, and a bottom-right-lock (B-R-LOCK) content portion which directionally locks content portions to the top and left of the demarcation point 306.

In the illustrated example of FIG. 3, a user selects the top-left-lock (T-L-LOCK) option in the lock menu 310 to allow the top-side content portion 302 to scroll only in directions parallel to demarcation line 322 and to allow the left-side content portion 304 to scroll only in directions parallel to demarcation line 320. In this manner, the top-side content portion 302 and the left-side content portion 304 remain directionally locked, while the user scrolls through the content portion 308. In some examples, to disable the top-side content portion 302 and the left-side content portion 304 from being directionally locked, a user opens the lock menu 310 and de-selects the previously selected lock option. In other examples, to disable the top-side content portion 302 and the left-side content portion 304 from being directionally locked, a user taps at or about demarcation point 306 on the display.

In some examples, to keep the top-side content portion 302 and the left-side content portion 304 directionally locked, while the content portion 308 is scrolled, the mobile device 300 copies the top-side content portion 302 and the left-side content portion 304 to make respectively a top-side content portion image 314 and left-side content portion image 318. In some examples, the top-side and left-side content portion images are then overlaid on respective ones of the top-side content portion 302 and the left-side content portion 304, so that the images are displayed in the display portions. For example, to scroll the content portion 308 in upward and/or downward directions as generally indicated by arrow 312, while keeping the top-side content portion 302 directionally locked, a top-side content portion image 314 is generated, copying the column labels 102 displayed in the top-side content portion 302, and the top-side content portion image 314 is overlaid on the top-side content portion 302 to create a directionally locked content portion image. In this manner, the top-side content portion image 314 remains directionally locked while the user navigates through the content portion 308 to bring the top-side content portion image 314 adjacent to other information in the content portion 308 that the user desires to compare with or view in connection with the information in the top-side content portion image 314. in an example, to scroll the content portion 308 in left and/or right directions as generally indicated by arrow 316, while keeping the left-side content portion 304 directionally locked, a left-side content portion image 318 is generated, copying the row labels 104 displayed in the left-side content portion 304, and the left-side content portion image 318 is overlaid on the left-side content portion 304 to create a directionally content portion image. In this manner, the left-side content portion image 318 remains directionally locked while the user navigates through the content portion 308 to bring the left-side content portion image 318 adjacent to other information in the content portion 308 that the user desires to compare with or view in connection with the information in the left-side content portion image 318.

Instead of generating images and overlaying the images on the content portions, other examples display in the display portions logically separate content portions including one or more directionally locked content portions (e.g., the top-side content portion 302 and the left-side content portion 304) and one or more scrollable content portions (e.g., the scrollable content portion 308). In this manner, each display portion displays content portions (e.g., the directionally locked top-side content portion 302 and left-side content portion 304) of an electronic document instead of displaying an image representative of that electronic document portion. In such examples, one or more logical display boundaries are determined based on the demarcation point 306 to allow movement of content portion(s) that are scrollable in all directions (e.g., the scrollable content portion 308), relative to directionally locked content portion(s) (e.g., the top-side content portion 302 and the left-side content portion 304).

In an example, when the user scrolls the content portion 308 in upward and/or downward directions as indicated generally by arrow 312, the left-side content portion 304 (or left-side content portion image 318) displaying row labels 104, scrolls upward and/or downward concurrently with the content portion 308. That is, the left-side content portion 304 (or its image 318) is directionally locked so that it is allowed to scroll only in directions upward and/or downward directions, concurrently with upward/downward (e.g., vertical) scrolling of the content portion 308. In some examples, when the left-side content portion 304 (or its image 318) is scrolling concurrently with content portion 308, the left-side content portion 304 (or its image 318) is scrolling at substantially the same displacement as the scrolling of content portion 308.

Similarly, when the user scrolls the content portion 308 in right and/or left directions as indicated generally by arrow 316, the top-side content portion 302 (or the top-side content portion image 314) displaying column labels 102, scrolls to the right and/or left concurrently with the content portion 308. That is, the top-side content portion 302 (or its image 314) is directionally locked so that it is allowed to scroll only in left and/or right directions concurrently with left/right (e.g., horizontal) scrolling of the content portion 308. In some examples, when the top-side content portion 302 (or its image 314) is scrolling concurrently with content portion 308, the top-side content portion 302 (or its image 314) is scrolling at substantially the same displacement as the scrolling of content portion 308.

In an example, when the user scrolls top-side content portion 302 (or top-side content portion image 314) in a right or left direction, content portion 308 concurrently scrolls in the same right or left direction, but left-side content portion 304 (or left-side content portion image 318) does not concurrently scroll in the right or left direction. In another example, when the user scrolls top-side content portion 302 (or the top-side content portion image 314) in an upward or downward direction, content portion 308 and left-side content portion 304 (or left-side content portion image 318) do not concurrently scroll in the upward or downward direction.

In an example, when the user scrolls left-side content portion 304 (or left-side content portion image 318) in an upward or downward direction, content portion 308 concurrently scrolls in the same upward or downward direction, but top-side content portion 302 (or top-side content portion image 314) does not concurrently scroll in the upward or downward direction. In another example, when the user scrolls left-side content portion 304 (or left-side content portion image 318)

in a right or left direction, content portion 308 and top-side content portion 302 (or top-side content portion image 314) do not concurrently scroll in the right or left direction.

In examples in which a user scrolls diagonally, the top-side content portion 302 (or its image 314) and the left-side content portion 304 (or its image 318) remain displayed at their respective display locations on the mobile device 300 while the column labels 102 scroll horizontally and the row labels 104 scroll vertically concurrently with the user-controlled scrolling of the scrollable content portion 308. In this manner, the column labels 102 and the row labels 104 are displayed in corresponding alignment with respective information in the content portion 308.

To keep the top-side content portion 302 (or its image 314) and the left-side content portion 304 (or its image 318) at their respective top and left display locations while scrolling the column labels 102 and the row labels 104, the top-side content portion image 314 includes the entire length of the contents (e.g., the column labels 102) of the top-side content portion 302, and the left-side content portion image 318 includes the entire length of the contents (e.g., the row labels 104) of the left-side content portion 304.

FIGS. 4-7 depict different user-specified directionally locked content portions in connection with the example scroll-intensive electronic document 100 of FIG. 1 displayed on the mobile device 300 of FIG. 3. The different user-specified directionally locked content portions of FIGS. 4-7 can be set as discussed above in connection with FIG. 3 based on user-specified demarcation points (e.g., the demarcation point 306 of FIG. 3) and user-selected lock content portions of the lock menu 310 of FIG. 3. In the illustrated example of FIG. 4, a user specifies a demarcation point 402 and directionally locks content portions to the left and below the demarcation point 402 such that a left-side content portion 404 remains directionally locked and a bottom-side content portion 406 remains directionally locked, while a user navigates through a scrollable content portion 408. In the illustrated example of FIG. 5, a user specifies a demarcation point 502 and directionally locks a content portion above the demarcation point 502 such that a top-side content portion 504 remains directionally locked, while a user navigates through a scrollable content portion 506. In the illustrated example of FIG. 6, a user specifies a demarcation point 602 and directionally locks a content portion to the left of the demarcation point 602 such that a left-side content portion 604 remains directionally locked, while a user navigates through a scrollable content portion 606. In the illustrated example of FIG. 7, a user specifies a demarcation point 702 and directionally locks a content portion to the right of the demarcation point 702 such that a right-side content portion 704 remains directionally locked, while a user navigates through a scrollable content portion 706. Although not shown, in some examples, the mobile device 300 is configured to receive multiple demarcation points for which a user specifies multiple portions (e.g., left and right portions or top and bottom portions) of a displayed document to be directionally locked.

Figure 8:
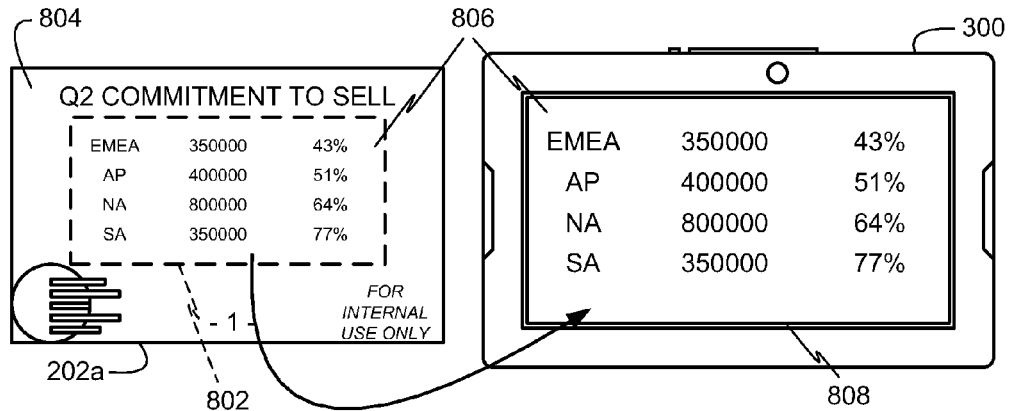
FIGS. 8-10 depict pages of the example border-intensive electronic document of FIG. 2 displayed on a mobile device in an automatically zoomed manner using examples disclosed herein.
Figure 9:
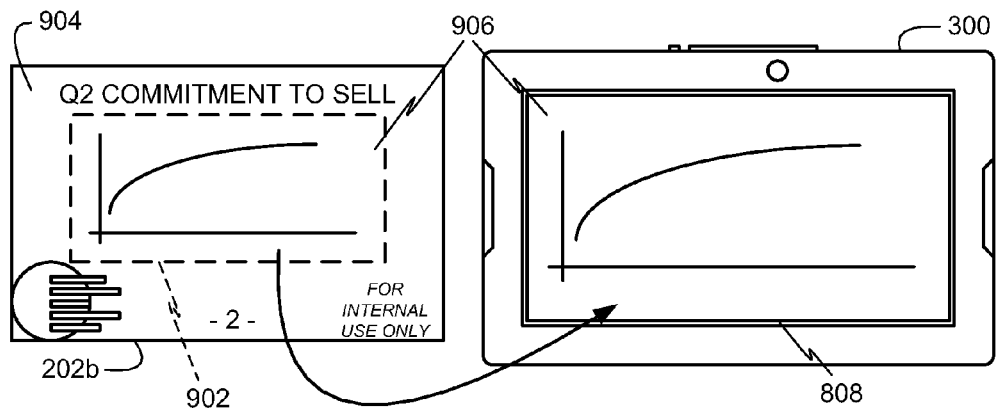
Figure 10:
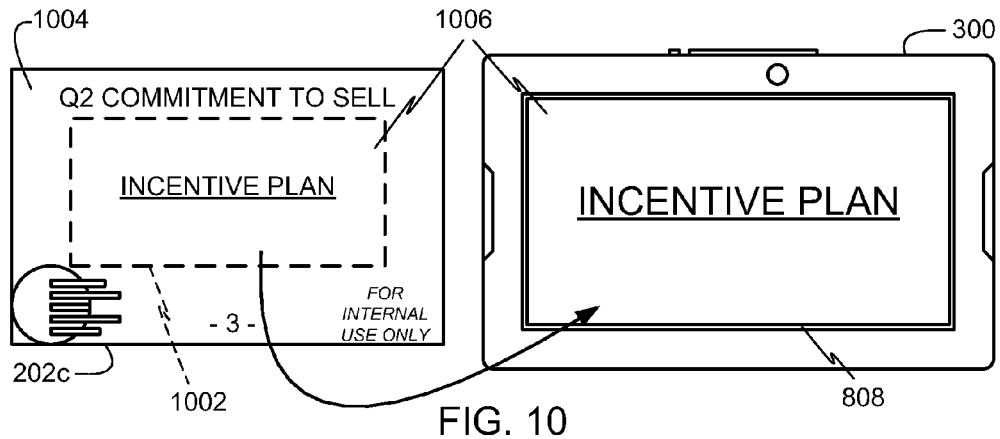

FIGS. 8-10 depict pages of the example border-intensive electronic document 200 of FIG. 2 displayed on the mobile device 300 in an automatically zoomed manner (e.g., an auto-zoom mode). In the illustrated examples of FIGS. 8-10, common features among the pages 202a-c are detected and/or features in each page 202a-c that are deemed of little or no relevance for display are detected. Example features to be excluded from display in FIGS. 8-10 include titles, logos, page numbering, disclaimer text, and blank space on the borders 204a-c (FIG. 2). The illustrated examples of FIGS. 8-10 show phantom boundary lines 802, 902, and 1002 (shown for illustrative purposes and ease of discussion) separating non-display content portions 804, 904, and 1004 from content portions 806, 906, and 1006. In the illustrated examples of FIGS. 8-10, the mobile device 300 enlarges or zooms into the contents of the content portions 806, 906, and 1006 and fills its display (e.g., a display area used for displaying the pages 202a-c) with the enlarged or zoomed-in content portions 806, 906, and 1006 while excluding the non-content portions 804, 904, and 1004 from its display (e.g., the display area used for displaying the pages 202a-c).

In some examples, the mobile device 300 is configured to automatically detect and display information using an auto-zoom mode as described in connection with FIGS. 8-10 when a document is opened. In other examples, the mobile device 300 is configured to prompt a user with a message including a selectable option to use the auto-zoom mode as described in connection with FIGS. 8-10. For example, a user may set a device or application configuration profile to automatically perform the above-described auto-zoom methods when displaying documents or to prompt the user with a user-confirmation request message prior to performing the above-described detection and zoom methods. In yet other examples, the mobile device 300 may be configured to provide a menu to a user offering a selectable option to specify when to perform the auto-zoom methods described in connection with FIGS. 8-10. In this manner, the user can manually control when to use the auto-zoom mode. In yet other examples, the auto-zoom methods may be invoked in response to a user double tapping on the display of the mobile device 300. In some examples, to exit the auto-zoom mode, a user de-selects an auto-zoom option via a menu item and/or uses any other suitable gesture configured to end the auto-zoom mode.

In some examples, the mobile device 300 determines that it cannot detect features on one or more pages to designate as non-display portions (e.g., non-display content portions 804, 904, and 1004). In such examples, the mobile device 300 determines that it cannot differentiate between portions of a page (or pages) that it deems not relevant for display from portions deemed relatively more relevant for display. In such examples, the mobile device 300 presents a notification (e.g., a visual or audible notification) informing a user that an auto-zoom mode cannot be used with a current document.

In some examples, when the mobile device 300 is displaying a page in an auto-zoom mode as shown in FIGS. 8-10, the mobile device 300 also displays a visual cue indicating that it is operating in an auto-zoom mode. In the illustrated examples of FIGS. 8-10, an example visual indicator is a double lined border 808 around the content portions 806, 906, and 1006. In this manner, a user can detect when the mobile device 300 is using the auto-zoom mode. In other examples, additional or alternative visual cues may be used such as a colored line border, a dashed line border, or a blinking border.

Figure 11:
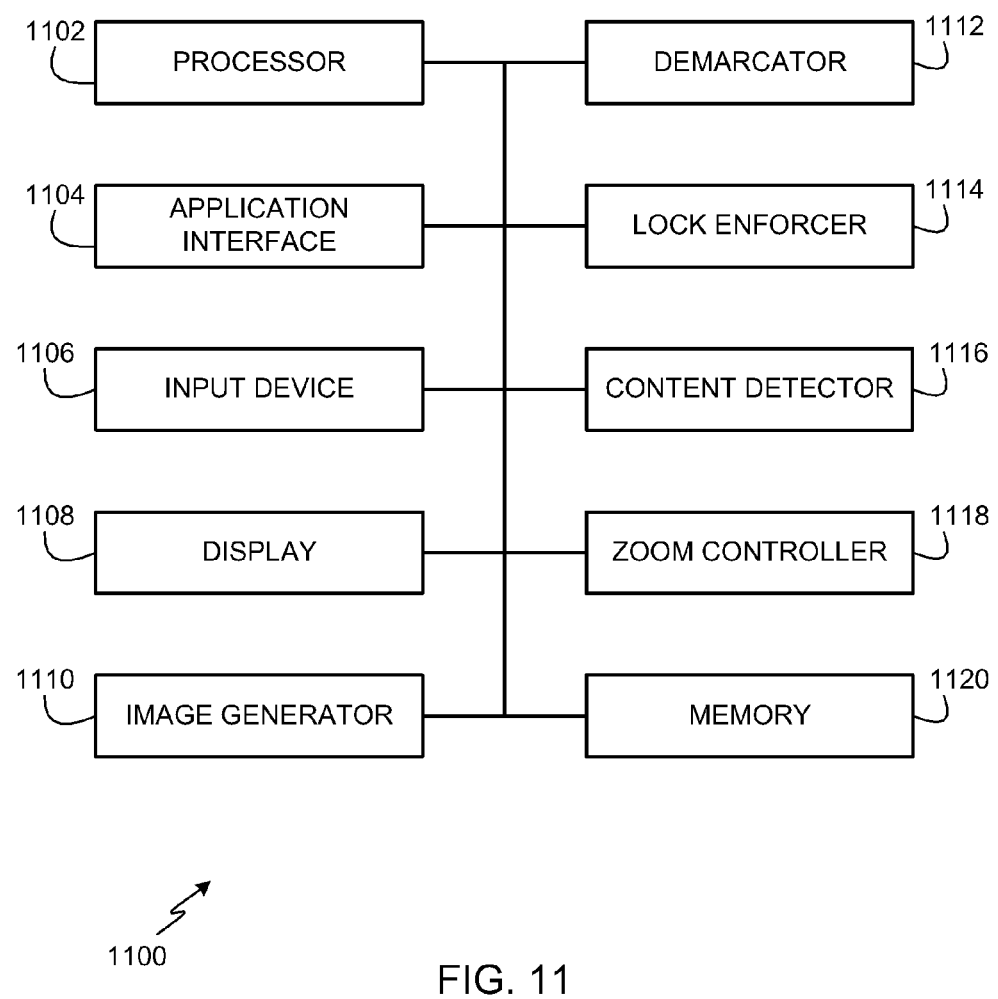
FIG. 11 depicts an example apparatus that may be used to implement examples disclosed herein to navigate electronic documents as shown in FIGS. 3-10.

FIG. 11 depicts an example apparatus 1100 that may be used to implement examples disclosed herein to navigate electronic documents (e.g., the example scroll-intensive electronic document 100 of FIGS. 1 and 3-7 and the example border-intensive electronic document 200 of FIGS. 2 and 8-10) as shown in FIGS. 3-10. In the illustrated example of FIG. 11, the apparatus 1100 is provided with example subsystems including: a processor (or controller) 1102, an example application interface 1104, an example input device 1106, an example display 1108, an example image generator 1110, an example demarcator 1112, an example lock enforcer 1114, an example content detector 1116, an example zoom controller 1118, and an example memory 1120. The subsystems 1102-1120 may be implemented using any desired combination of hardware, firmware, and/or software. For example, one or more integrated circuits, discrete semiconductor components, and/or passive electronic components may be used. Thus, for example, the subsystems 1102-1120, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The subsystems 1102-1120, or parts thereof, may be implemented using instructions, code, and/or other software and/or firmware, etc. stored on a machine accessible medium or computer readable medium (e.g., the memory 1120) and executable by, for example, a processor (e.g., the example processor 1102). When any of the apparatus or system claims of this patent is read to cover a purely software implementation, at least one of the subsystems 1102-1120 is hereby expressly defined to include a tangible medium such as a solid state memory, a magnetic memory, a digital versatile disk (DVD), a compact disk (CD), a BluRay disk, etc. Further still, the example apparatus 1100 of FIG. 11 may include one or more elements, methods and/or devices in addition to, or instead of, those illustrated in FIG. 11, and/or may include more than one of any or all of the illustrated elements, methods and devices. In addition, although the apparatus 1100 is described as implementing both the directionally locking techniques of FIGS. 3-7 and the auto-zoom techniques of FIGS. 8-10, in some examples, the apparatus 1100 may be configured to implement only the directionally locking techniques or only the auto-zoom techniques.

Turning in detail to FIG. 11, the apparatus 1100 of the illustrated example is provided with the example processor 1102 to control and/or manage operations of the mobile device 300 of FIGS. 3-10. In the illustrated example, the processor 1102 receives requests to open and display electronic documents (e.g., the electronic documents 100 of FIGS. 1 and 200 of FIG. 2) on the mobile device 300. In addition, the processor 1102 makes decisions and facilitates/arbitrates information exchanges between elements of the apparatus 1100.

In the illustrated example, the apparatus 1100 is provided with the application interface 1104 to access and/or communicate with one or more application(s) to directionally lock content portion(s) for documents rendered by the application(s) and/or to auto-zoom and selectively display content of border-intensive documents rendered by the application(s). In some examples, the application interface 1104 is implemented using OS-level processes or functions or is an application programming interface (API) that allows OS-level processes or functions to access and/or communicate with the application(s). In some examples, the application interface 1104 is used in a software module that is configured to operate as an add-on or plug-in module that can be added to the application(s).

In the illustrated example, the apparatus 1100 is provided with the input device 1106 to receive inputs that are input by a user using an input device (e.g., a touch screen display, a mouse pointer, a touch pad, buttons, a keyboard, a microphone, etc.). In the illustrated example, the input device 1106 is implemented using a touch screen display. However, in other examples, the input device 1106 may additionally or alternatively be implemented using other types of input device interfaces (e.g., a mouse interface, a touch pad interface, a button interface, a keyboard interface, a voice interface, etc.).

In the illustrated example, the apparatus 1100 is provided with the display 1108 (e.g., a display of the mobile device 300 of FIGS. 3-10) that is configured to provide a graphical user interface and display electronic documents (e.g., the electronic documents 100 of FIGS. 1 and 200 of FIG. 2). In the illustrated example, the display 1108 is a liquid crystal display. Additionally or alternatively, the display 1108 may be made of another type of display technologies such as e-paper displays, cathode ray tube (CRT) displays, light-emitting diode (LED) displays, etc.

In the illustrated example, the apparatus 1100 is provided with the image generator 1110 to generate images of electronic document views (e.g., views or pages of the electronic documents 100 of FIGS. 1 and 200 of FIG. 2). In the illustrated example, the apparatus 1100 uses images of electronic document views for displaying in the display of the mobile device 300 in accordance with examples disclosed herein to facilitate user navigation of electronic documents. In some examples, the apparatus 1100 uses images of document views to display directionally locked content portions of an electronic document so that a user can navigate scrollable content portions of the electronic document to view scrollable portions of the document relative to directionally locked portions of the document as shown in FIGS. 3-7. In some examples, the apparatus 1100 uses image versions of pages to detect border elements of an electronic document (e.g., the borders 204*a-c* of the example border-intensive electronic document 200 of FIGS. 2 and 8-10) and display zoomed contents on the mobile device 300 that include elements of interest to a user while excluding other contents that are deemed non-essential or of relatively less relevance for display. In some examples, the image generator 1110 also generates/draws the border 808 shown located around the content portions 806, 906, and 1006 in FIGS. 8-10.

In the illustrated example, the apparatus 1100 is provided with the demarcator 1112 to divide a display into display portions and display these display portions at least part of content portions, some of the content portions being directionally locked. Examples of directionally locked content portions are shown in FIGS. 3-7 as top-side content portion 302, left-side content portion 304, bottom-side content portion 406, top-side content portion 504, left-side content portion 604, and right-side content portion 704. In examples disclosed herein, such directionally locked content portions enable users to navigate scrollable portions of documents to view contents thereof relative to contents of directionally locked content portions of the documents.

In some examples for setting directionally locked content portions in a view of an electronic document (e.g., the scroll-intensive electronic document 100 of FIGS. 1 and 3-7) as discussed above in connection with FIGS. 3-7, the demarcator 1112 determines a display coordinate based on a demarcation point (e.g., the demarcation points 306, 402, 502, 602, and/or 702) from the input device 1106 defining a point on a display of the mobile device 300 at which a user indicated that the display is to be divided into display portions, in which content portions of the content are to be displayed. The demarcator 1112 of the illustrated examples uses such display coordinates to create demarcation lines separating a user-specified directionally locked content portion from a scrollable content portion of an electronic document (e.g., the electronic document 100 of FIGS. 1 and 3-7).

In the illustrated example, the apparatus 1100 is provided with the lock enforcer 1114 to directionally lock user-specified content portions of an electronic document (e.g., the scroll-intensive electronic document 100 of FIGS. 1 and 3-7) as discussed above in connection with FIGS. 3-7. The lock enforcer 1114 of the illustrated example receives boundary descriptor(s) from the demarcator 1112 specifying demarcation lines separating directionally locked content portions from scrollable content portions of an electronic document view. In this manner, the lock enforcer 1114 can use the boundary descriptor(s) to enforce directionally locking the specified content portion(s).

In the illustrated example, the apparatus 1100 is provided with the content detector 1116 to identify content portions of one or more document pages having information (e.g., display elements) to be excluded from display to facilitate displaying zoomed-in views of document contents deemed of relatively more interest for display to a user. In the illustrated example, the content detector 1116 is configured to distinguish content that is to be displayed from other content (e.g., content along borders of pages) that is to be excluded from display. In some examples, content portions along borders are considered non-essential information or information deemed to be of relatively less interest to users for viewing than other relatively more interesting information located at an inner content portion of a document page. Examples discussed above in connection with the border-intensive electronic document 200 of FIGS. 2 and 8-10 show borders (e.g., the borders 204a-c of FIG. 2 forming the non-display content portions 804, 904, and 1004 of FIGS. 8-10) that are excluded from being displayed via the mobile device 300 so that relatively more interesting information located at inner content portions of the pages can be displayed as enlarged views (e.g., zoomed-in views).

In the illustrated example, the content detector 1116 is provided with image recognition capabilities, blank space detection capabilities, pattern matching capabilities, and text recognition capabilities. In some examples, the content detector 1116 stores a library of known images that are specified as display elements that can be excluded from displayed document views. In such some examples, the content detector 1116 can use its image recognition capabilities to detect elements in documents that are stored in such a library of known images to identify border regions that are not to be displayed in document views. In some examples, the content detector 1116 uses its blank space detection capabilities to detect blank space in border content portions that do not have any information to be displayed. In such some examples, the blank spaces are excluded from being displayed. In some examples, the content detector 1116 uses its pattern matching capabilities to identify display elements that are repeated on borders of multiple pages of an electronic document to determine that such repeated or redundant elements can be excluded from displayed views of the document. For example, such repeated display elements may correspond to template borders that offer little or no meaning to the substantive contents of a document. In some examples, the content detector 1116 is provided with a library of known text that is specified as information that can be excluded from displayed document views. In such some examples, the content detector 1116 can use its text recognition capabilities to detect elements in document borders that are stored in such a library of known text to identify content portions that are not to be displayed in document views. Additionally or alternatively, the content detector 1116 can be provided with other capabilities suitable for identifying image elements along a page borders that are deemed of relatively little interest or no interest for displaying.

In the illustrated example, the apparatus 1100 is provided with the zoom controller 1118 to set zoom levels for enlarging views of document pages to be displayed. To display automatically zoomed contents of an electronic document (e.g., the border-intensive electronic document 200 of FIGS. 2 and 8-10) as discussed above in connection with FIGS. 8-10, the zoom controller 1118 receives document coordinates or boundary descriptors from the content detector 1116. The zoom controller 1118 uses such document coordinates or boundary descriptors to identify content portion(s) of page(s) to be excluded from display. The zoom controller 1118 enlarges or zooms in on portions of the document page(s) having information (e.g., display elements) that are to be displayed in document views to facilitate viewing document contents deemed of relatively more interest for users. In some examples, the zoom controller 1118 also controls zoom levels of scroll-intensive electronic documents (e.g., the scroll-intensive electronic document 100 of FIGS. 1 and 3-7) having directionally locked content portions (e.g., the directionally locked content portions 302 and 304 of FIG. 3) and scrollable content portions (e.g., the content portion 308 of FIG. 3). In such examples, the zoom controller 1118 controls the zoom levels for the directionally locked content portions (e.g., the directionally locked content portions 302 and 304 of FIG. 3) and the scrollable content portions (e.g., the content portion 308 of FIG. 3).

In the illustrated example, to store data and/or machine-readable or computer-readable instructions, the apparatus 1100 is provided with the memory 1120. The memory 1120 may be a mass storage memory magnetic or optical memory, a non-volatile integrated circuit memory, or a volatile memory. That is, the memory 1120 may be any tangible medium such as a solid state memory, a magnetic memory, a DVD, a CD, a BluRay disk, etc.

Figure 12:
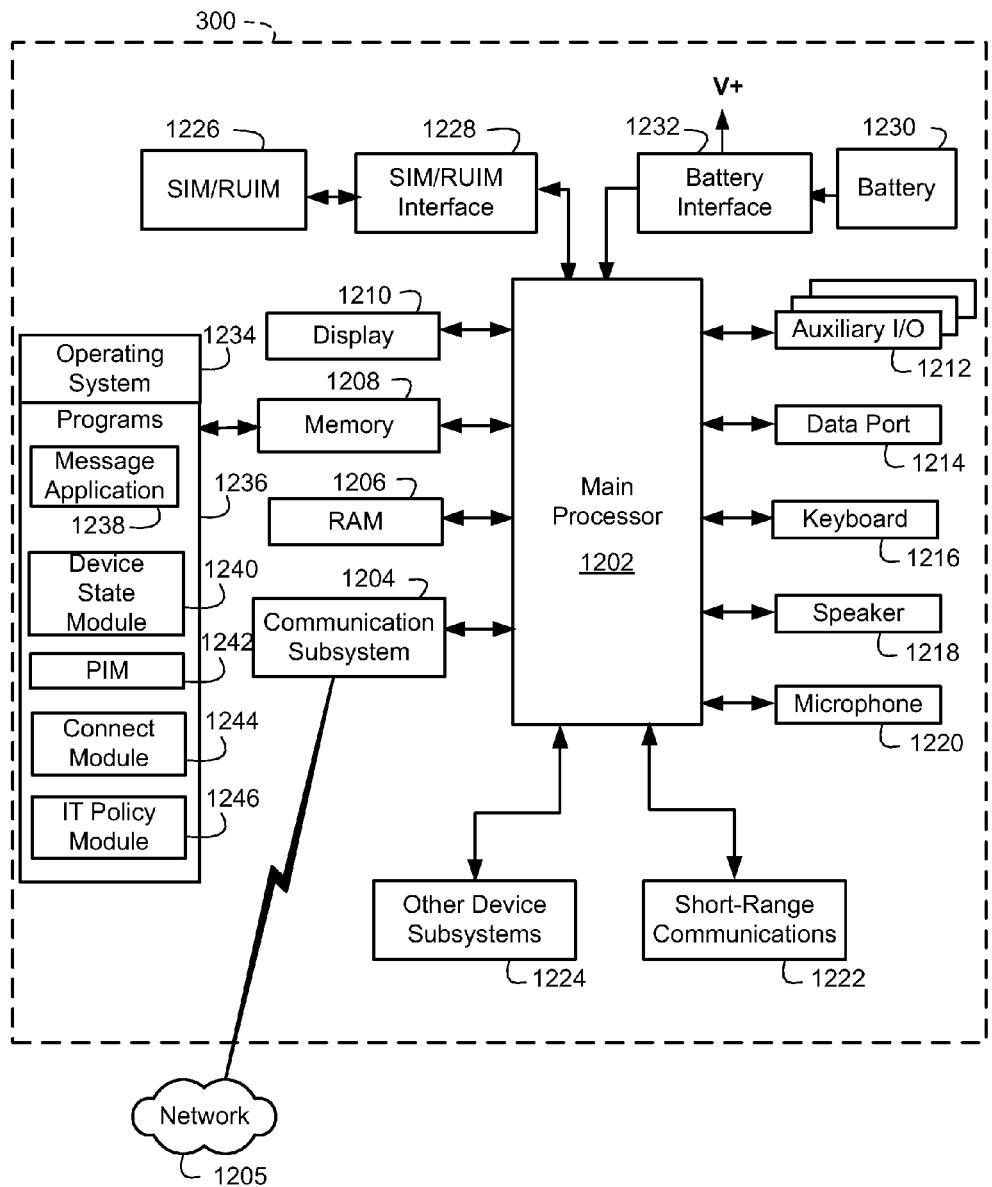
FIG. 12 depicts an example block diagram of a processor system that may be used to implement the mobile device of FIGS. 3-10.

FIG. 12 depicts a block diagram of an example implementation of a processor system that may be used to implement the mobile device 300 of FIGS. 3-10. In the illustrated example, the mobile device 300 is a two-way communication device with advanced data communication capabilities including the capability to communicate with other wireless-enabled devices or computer systems through a network of transceiver stations. The mobile device 300 may also have the capability to allow voice communication. Depending on the functionality provided by the mobile device 300, it may be referred to as a data messaging device, a two-way pager, a cellular telephone with data messaging capabilities, a smart phone, a wireless Internet appliance, a tablet device, or a data communication device (with or without telephony capabilities). In some examples, the processor system of FIG. 12 is used to implement the example apparatus 1100 of FIG. 11. Although FIG. 12 depicts an example implementation of the mobile device 300 as having a number of components, in some example implementations, some of the components shown in FIG. 12 may be omitted and/or may be externally connected to the mobile device 300 (e.g., via interface port(s) and/or via wireless interface(s)). To aid the reader in understanding the structure of the mobile device 300 and how it communicates with other devices and host systems, FIG. 12 will now be described in detail.

Referring to FIG. 12, the mobile device 300 includes a number of components such as a main processor 1202 (e.g., similar or identical to the processor 1102 of FIG. 11), that is directly or indirectly connected to the other components, and controls the overall operation of the mobile device 300. Communication functions, including data and voice communications, are performed through a communication subsystem 1204. The communication subsystem 1204 receives messages from and sends messages to a wireless network 1205. In the illustrated example of the mobile device 300, the communication subsystem 1204 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). In some examples, the communication subsystem 1204 is configured in accordance with the 3rd Generation Partnership Project (3GPP) Long Term Evolution (LTE), which is the next evolutionary phase of UMTS and CDMA2000 networks to a common air interface standard. New standards are still being defined, but it is believed that they will have similarities to the network behavior described herein, and it will also be understood by persons skilled in the art that the example implementations described herein are intended to use any other suitable standards that are developed in the future. The wireless link connecting the communication subsystem 1204 with the wireless network 1205 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1205 associated with the mobile device 300 is a GSM/GPRS wireless network in one exemplary implementation, other wireless networks may also be associated with the mobile device 300 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, MOBITEX® and DATATAC® network communication systems. Examples of other voice-centric data networks include Personal Communication Systems (PCS) networks like GSM and Time Division Multiple Access (TDMA) systems.

The main processor 1202 also interacts with additional subsystems such as a Random Access Memory (RAM) 1206, a persistent memory 1208 (e.g., a non-volatile memory), a display 1210, an auxiliary input/output (I/O) subsystem 1212, a data port 1214, a keyboard 1216, a speaker 1218, a microphone 1220, short-range communications 1222, and other device subsystems 1224.

Some of the subsystems of the mobile device 300 perform communication-related functions, whereas other subsystems may provide "resident" or on-device functions. By way of example, the display 1210 and the keyboard 1216 may be used for both communication-related functions, such as entering a text message for transmission over the network 1205, and device-resident functions such as a calculator or task list.

The mobile device 300 can send and receive communication signals over the wireless network 1205 after required network registration or activation procedures have been completed. Network access is associated with a subscriber or user of the mobile device 300. To identify a subscriber, the mobile device 108 requires a SIM/RUIM card 1226 (i.e. Subscriber Identity Module or a Removable User Identity Module) to be inserted into a SIM/RUIM interface 1228 in order to communicate with a network. The SIM card or RUIM 1226 is one type of a conventional "smart card" that can be used to identify a subscriber of the mobile device 300, and to personalize the mobile device 300, among other things. Without the SIM card 1226, the mobile device 300 is not fully operational for communication with the wireless network 1205. By inserting the SIM card/RUIM 1226 into the SIM/RUIM interface 1228, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 1226 includes a processor and memory for storing information. Once the SIM card/RUIM 1226 is inserted into the SIM/RUIM interface 1228, it is coupled to the main processor 1202. In order to identify the subscriber, the SIM card/RUIM 1226 can include some user parameters such as an International Mobile Subscriber Identity (IMSI). An advantage of using the SIM card/RUIM 1226 is that a subscriber is not necessarily bound by any single physical mobile device. The SIM card/RUIM 1226 may store additional subscriber information for a mobile device as well, including datebook (or calendar) information and recent call information. Alternatively, user identification information can also be programmed into the persistent memory 1208.

The mobile device 300 is a battery-powered device and includes a battery interface 1232 for receiving one or more rechargeable batteries 1230. In at least some embodiments, the battery 1230 can be a smart battery with an embedded microprocessor. The battery interface 1232 is coupled to a regulator (not shown), which assists the battery 1230 in providing power V+ to the mobile device 300. Although current technology makes use of a battery, future technologies such as micro fuel cells may provide the power to the mobile device 300.

The mobile device 300 also includes an operating system 1234 and software components 1236 to 1246 which are described in more detail below. The operating system 1234 and the software components 1236 to 1246 that are executed by the main processor 1202 are typically stored in a persistent store such as the persistent memory 1208, which may alternatively be a read-only memory (ROM) or similar storage element (not shown). Those skilled in the art will appreciate that portions of the operating system 1234 and the software components 1236 to 1246, such as specific device applications, or parts thereof, may be temporarily loaded into a volatile store such as the RAM 1206. Other software components can also be included, as is well known to those skilled in the art.

The subset of software applications 1236 that control basic device operations, including data and voice communication applications, will normally be installed on the mobile device 300 during its manufacture. Other software applications include a message application 1238 that can be any suitable software program that allows a user of the mobile device 300 to send and receive electronic messages. Various alternatives exist for the message application 1238 as is well known to those skilled in the art. Messages that have been sent or received by the user are typically stored in the persistent memory 1208 of the mobile device 300 or some other suitable storage element in the mobile device 300. In at least some embodiments, some of the sent and received messages may be stored remotely from the mobile device 300 such as in a data store of an associated host system that the mobile device 300 communicates with.

The software applications can further include a device state module 1240, a Personal Information Manager (PIM) 1242, and other suitable modules (not shown). The device state module 1240 provides persistence (i.e., the device state module 1240 ensures that important device data is stored in persistent memory, such as the persistent memory 1208, so that the data is not lost when the mobile device 300 is turned off or loses power).

The PIM 1242 includes functionality for organizing and managing data items of interest to the user, such as, but not limited to, e-mail, contacts, calendar events, voice mails, appointments, and task items. A PIM application has the ability to send and receive data items via the wireless network 1205. PIM data items may be seamlessly integrated, synchronized, and updated via the wireless network 1205 with the mobile device subscriber's corresponding data items stored and/or associated with a host computer system. This functionality creates a mirrored host computer on the mobile device 300 with respect to such items. This can be particularly advantageous when the host computer system is the mobile device subscriber's office computer system.

The mobile device 300 also includes a connect module 1244, and an IT policy module 1246. The connect module 1244 implements the communication protocols that are required for the mobile device 300 to communicate with the wireless infrastructure and any host system, such as an enterprise system, that the mobile device 300 is authorized to interface with.

The connect module 1244 includes a set of APIs that can be integrated with the mobile device 300 to allow the mobile device 300 to use any number of services associated with the enterprise system. The connect module 1244 allows the mobile device 300 to establish an end-to-end secure, authenticated communication pipe with the host system. A subset of applications for which access is provided by the connect module 1244 can be used to pass IT policy commands from the host system (e.g., from an IT policy server of a host system) to the mobile device 300. This can be done in a wireless or wired manner. These instructions can then be passed to the IT policy module 1246 to modify the configuration of the mobile device 300. Alternatively, in some cases, the IT policy update can also be done over a wired connection.

The IT policy module 1246 receives IT policy data that encodes the IT policy. The IT policy module 1246 then ensures that the IT policy data is authenticated by the mobile device 300. The IT policy data can then be stored in the flash memory 1206 in its native form. After the IT policy data is stored, a global notification can be sent by the IT policy module 1246 to all of the applications residing on the mobile device 300. Applications for which the IT policy may be applicable then respond by reading the IT policy data to look for IT policy rules that are applicable.

The IT policy module 1246 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 1246 can determine which applications (e.g., document readers and/or editors to view/edit the electronic documents 100 of FIGS. 1 and 200 of FIG. 2) are affected by the IT policy data and send a notification to only those applications. In either of these cases, for applications that aren't running at the time of the notification, the applications can call the parser or the IT policy module 1246 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 1246 sends an acknowledgement back to the host system to indicate that the IT policy data was received and successfully applied.

Other types of software applications can also be installed on the mobile device 300. These software applications can be third party applications, which are added after the manufacture of the mobile device 300. Examples of third party applications include games, calculators, utilities, productivity applications, etc.

The additional applications can be loaded onto the mobile device 300 through at least one of the wireless network 1205, the auxiliary I/O subsystem 1212, the data port 1214, the short-range communications subsystem 1222, or any other suitable device subsystem 1224. This flexibility in application installation increases the functionality of the mobile device 300 and may provide enhanced on-device functions, communication-related functions, or both. For example, secure communication applications may enable electronic commerce functions and other such financial transactions to be performed using the mobile device 300.

The data port 1214 enables a subscriber to set preferences through an external device or software application and extends the capabilities of the mobile device 300 by providing for information or software downloads to the mobile device 300 other than through a wireless communication network. The alternate download path may, for example, be used to load an encryption key onto the mobile device 300 through a direct and thus reliable and trusted connection to provide secure device communication.

The data port 1214 can be any suitable port that enables data communication between the mobile device 300 and another computing device. The data port 1214 can be a serial or a parallel port. In some instances, the data port 1214 can be a USB port that includes data lines for data transfer and a supply line that can provide a charging current to charge the battery 1230 of the mobile device 300.

The short-range communications subsystem 1222 provides for communication between the mobile device 300 and different systems or devices, without the use of the wireless network 1205. For example, the subsystem 1222 may include an infrared device and associated circuits and components for short-range communication. Examples of short-range communication standards include standards developed by the Infrared Data Association (IrDA), a Bluetooth® communication standard, and the 802.11 family of standards developed by IEEE.

In use, a received signal such as a text message, an e-mail message, web page download, media content, etc. will be processed by the communication subsystem 1204 and input to the main processor 1202. The main processor 1202 will then process the received signal for output to the display 1210 or alternatively to the auxiliary I/O subsystem 1212. A subscriber may also compose data items, such as e-mail messages, for example, using the keyboard 1216 in conjunction with the display 1210 and possibly the auxiliary I/O subsystem 1212. The auxiliary subsystem 1212 may include input devices such as: a touch screen display, mouse, track ball, infrared fingerprint detector, or a roller wheel with dynamic button pressing capability. The keyboard 1216 is preferably an alphanumeric keyboard and/or telephone-type keypad. However, other types of keyboards may also be used.

A composed item may be transmitted over the wireless network 1205 through the communication subsystem 1204.

For voice communications, the overall operation of the mobile device 300 is substantially similar, except that the received signals are output to the speaker 1218, and signals for transmission are generated by the microphone 1220. Alternative voice or audio I/O subsystems, such as a voice message recording subsystem, can also be implemented on the mobile device 300. Although voice or audio signal output is accomplished primarily through the speaker 1218, the display 1210 can also be used to provide additional information such as the identity of a calling party, duration of a voice call, or other voice call related information.

Figure 13:
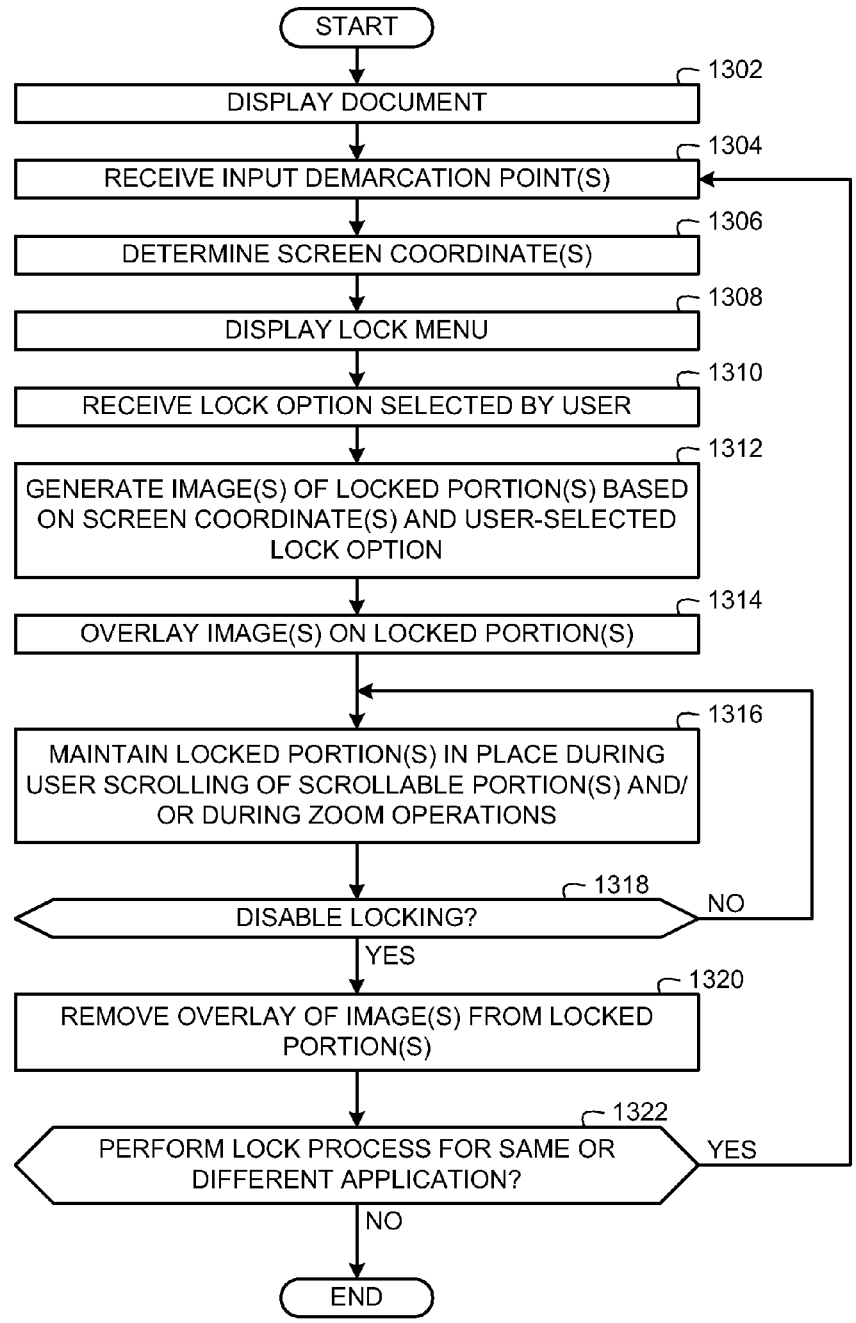
FIG. 13 depicts an example flow diagram representative of machine readable instructions that may be used to implement the apparatus of FIG. 11 to set directionally locked content portions to facilitate user-navigation of electronic documents as shown in FIGS. 3-7.
Figure 14:
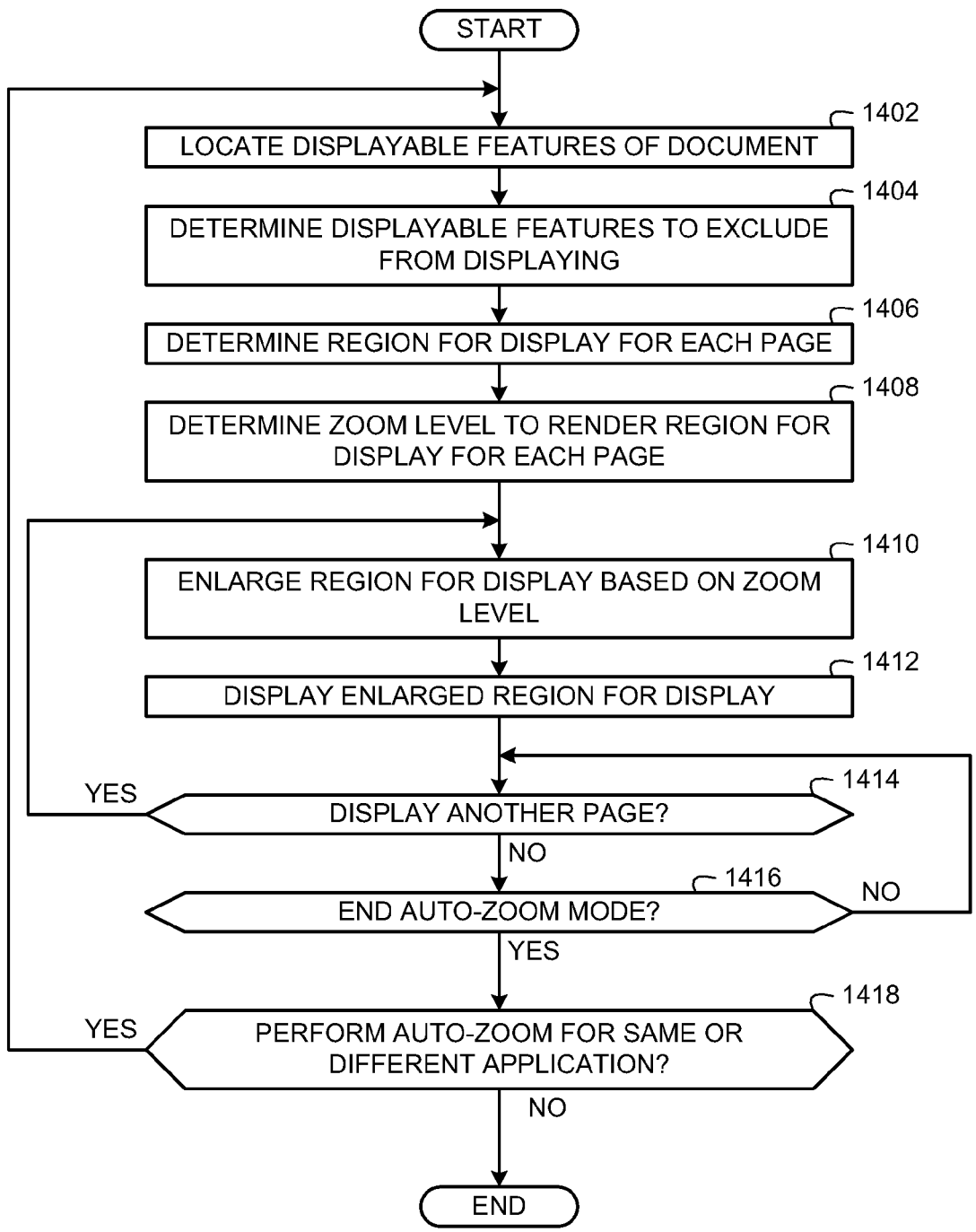
FIG. 14 depicts an example flow diagram representative of machine readable instructions that may be used to implement the apparatus of FIG. 11 to display automatically zoomed contents to facilitate viewability of electronic documents as shown in FIGS. 8-10.

FIG. 13 depicts an example flow diagram representative of machine readable instructions that may be used to implement the apparatus 1100 of FIG. 11 to set directionally locked content portions to facilitate user-navigation of electronic documents as described above in connection with FIGS. 3-7. FIG. 14 depicts an example flow diagram representative of machine readable instructions that may be used to implement the apparatus 1100 of FIG. 11 to display automatically zoomed contents to facilitate viewability of electronic documents as described above in connection with FIGS. 8-10. The example methods of FIGS. 13 and 14 may be performed using one or more processors, controllers, and/or any other suitable processing devices (e.g., the example processor 1102 of FIG. 11 and/or the example processor 1202 of FIG. 12). For example, the example methods of FIGS. 13 and 14 may be implemented using coded instructions (e.g., computer readable instructions) stored on one or more tangible computer readable media such as flash memory, read-only memory (ROM), and/or random-access memory (RAM), a CD-ROM, a floppy disk, a hard drive, a DVD, a BluRay disk, or a memory associated with the processor 1102 and/or 1202. In some examples, the methods in their entireties and/or parts thereof could alternatively be executed by a device other than the processor 1102 and/or 1202 and/or embodied in firmware or dedicated hardware. As used herein, the term tangible computer readable medium is expressly defined to include any type of computer readable storage and to exclude propagating signals. Additionally or alternatively, the example methods of FIGS. 13 and 14 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term tangible computer readable medium is expressly defined to include any type of computer readable medium and to exclude propagating signals.

Additionally or alternatively, the example methods of FIGS. 13 and 14 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example methods of FIGS. 13 and 14 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example methods of FIGS. 13 and 14 may be implemented manually or as any combination(s) of any of the foregoing techniques, for example, any combination of firmware, software, discrete logic and/or hardware. Further, although the example methods of FIGS. 13 and 14 are described with reference to the flow diagrams of FIGS. 13 and 14, other methods of implementing the methods of FIGS. 13 and 14 may be employed. For example, the order of execution of the blocks may be changed, and/or some of the blocks described may be changed, eliminated, sub-divided, or combined. Additionally, any or all of the example methods of FIGS. 13 and 14 may be performed sequentially and/or in parallel by, for example, separate processing threads, processors, devices, discrete logic, circuits, etc. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

In some examples, instructions to perform the example methods of FIGS. 13 and 14 are implemented in one or more operating system functions. In this manner, the example methods of FIGS. 13 and 14 are application-independent such that they can be used across different applications that interface with the operating system function(s). In other examples, instructions to perform the example methods of FIGS. 13 and 14 are implemented in add-on or plug-in modules that can be added to or installed in different applications. In yet other examples, instructions to perform the example methods of FIGS. 13 and 14 are implemented directly in applications.

Figure 7:
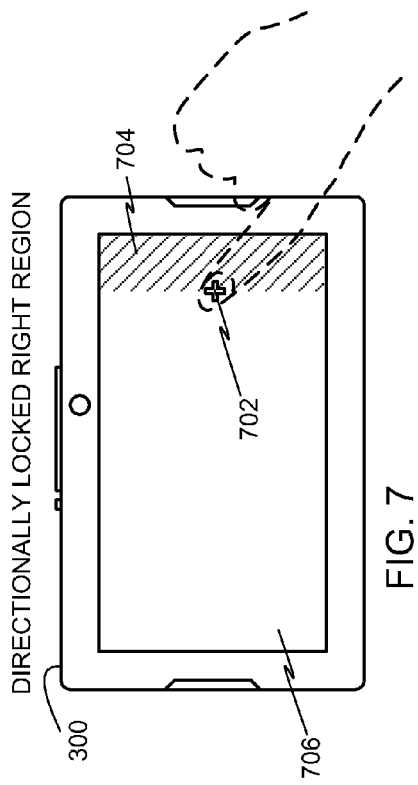
Figure 4:
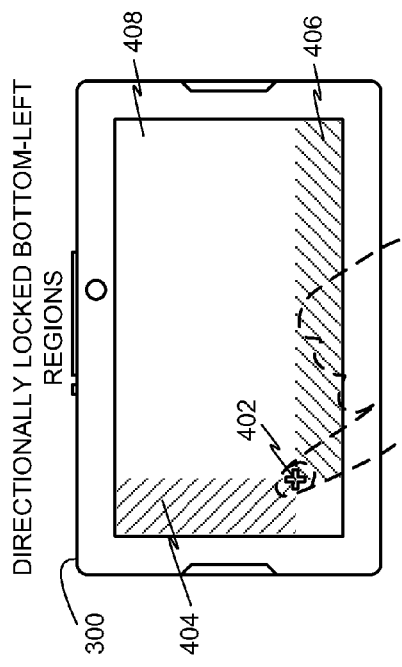
Figure 6:
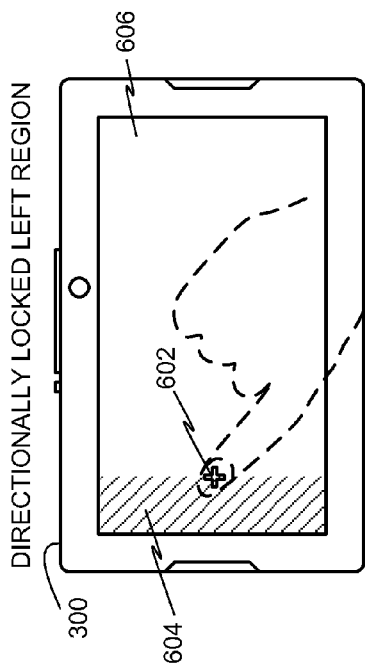

Now turning in detail to FIG. 13, initially, the display 1108 (FIG. 11) displays a document (block 1302) such as the scroll-intensive electronic document 100 of FIG. 1. The input device 1106 (FIG. 11) receives one or more divide inputs by a user (block 1304) such as one or more of the demarcation points 306 (FIG. 3), 402 (FIG. 4), 502 (FIG. 5), 602 (FIG. 6), and/or 702 (FIG. 7). The demarcator 1112 determines one or more display coordinate(s) (block 1306) corresponding to the divide inputs received at block 1304. In the illustrated example, the demarcator 1112 uses the display coordinate(s) to determine demarcation lines, dividing the display into display portions, in which content portions are displayed (e.g., the top-side content portion 302, the left-side content portion 304 of FIG. 3, the content portions 404 and 406 of FIG. 4, the content portion 504 of FIG. 5, the content portion 604 of FIG. 6, the content portion 704 of FIG. 7, and the content portion 308, 408, 506, 606, and 706 of FIGS. 3-7).

The display 1108 displays the lock menu 310 of FIG. 3 (block 1308). The input device 1106 receives a lock option selected by a user (block 1310) specifying one or more content portions to be directionally locked relative to the demarcation point(s) received at block 1304. The image generator 1110 (FIG. 11) generates one or more image(s) (e.g., the top-side content portion image 314 and the left-side content portion image 318 of FIG. 3) of content portions based on the one or more display coordinate(s) determined at block 1306 and the lock option (block 1312). The display 1108 then overlays the one or more image(s) on the content portion(s) (block 1314) as, for example, described above in connection with FIG. 3.

Alternatively, instead of generating images and overlaying the images on the user-specified directionally locked content portions at operations 1312 and 1314, other examples define logically separate content portions including one or more user-specified directionally locked content portions (e.g., the top-side content portion 302 and the left-side content portion 304 of FIG. 3) and one or more scrollable content portions (e.g., the scrollable content portion 308 of FIG. 3). In this manner, each logically separate content portion displays its portion (e.g., the top-side content portion 302, the left-side content portion 304, and the scrollable content portion 308) of an electronic document instead of displaying an image representative of that electronic document portion. In such examples, one or more logical demarcation lines are determined based on the demarcation point 306 to allow movement of scrollable content portion(s) (e.g., the scrollable content portion 308) relative to directionally locked content portion(s) (e.g., the top-side content portion 302 and the left-side content portion 304).

In the illustrated example of FIG. 13, the lock enforcer 1114 (FIG. 11) maintains the directionally locked content portion(s) (or images of the content portion(s) in some examples) in place during user scrolling of the scrollable portion(s) and/or during zoom operations (block 1316). For example, while a user scrolls through the content portion 308 of FIG. 3, the lock enforcer 1114 maintains the top-side content portion 302 (or its image 314) and the left-side content portion 304 (or its image 318) directionally locked at their respective display locations. In the illustrated example of FIG. 3, because the column labels 102 extend beyond the display of the mobile device 300, the lock enforcer 1114 allows the top-side content portion 302 (or its image 314) to scroll horizontally so that the column labels 102 move correspondingly with horizontal movements of the scrollable content portion 308 as discussed above in connection with FIG. 3. Also in the illustrated example of FIG. 3, because the row labels 104 extend beyond the display of the mobile device 300, the lock enforcer 1114 allows the left-side content portion 304 (or its image 318) to scroll vertically so that the row labels 104 move correspondingly with vertical movements of the scrollable content portion 308 as discussed above in connection with FIG. 3. In addition, for any zooming in or zooming out operations, the lock enforcer 1114 maintains the directionally locked portions (e.g., the top-side content portion 302 (or its image 314) and the left-side content portion 304 (or its image 318)) at their respective display locations while allowing their zoom level to be adjusted corresponding to zoom levels of the other content portion 308.

The lock enforcer 1114 determines whether it should disable directionally locking content portions (block 1318). For example, a user may specify that directionally locking of content portions should be turned off to allow scrolling the entire document (e.g., the scroll-intensive electronic document 100). If directionally locking should not be disabled (block 1318), control returns to block 1316 at which the lock enforcer 1114 continues to enforce directionally locking of user-selected content portions. If directionally locking should be disabled (block 1318), the display 1108 removes the overlay of one or more image(s) from the directionally locked content portion(s) (block 1320).

The application interface 1104 determines whether it should perform directionally locking for a same application or a different application (block 1322). For example, the application interface 1104 may be an operating system-level interface that facilitates performing the example method of FIG. 13 across different applications. In such examples, the application interface 1104 may receive a request from the same application that rendered the scroll-intensive electronic document 100 to directionally lock content portion(s) again or from another application to directionally lock content portion(s) for a document rendered by that application. If requested to perform directionally locking for the same or another application (block 1322), control returns to block 1304. In examples in which another application is requesting directionally locking, the example method of FIG. 13 operates to overlay one or more images onto directionally locked content portion(s) of content displayed by the other application, and prevent movement of the one or more image(s) relative to a scrollable portion of the content of the other application. If the application interface 1104 determines that it should not perform the directionally locking method again (block 1322), the example method of FIG. 13 ends.

Turning now to FIG. 14, initially, the content detector 1116 (FIG. 11) locates displayable features of a document (block 1402). In the illustrated example, the content detector 1116 detects all displayable features (e.g., features at border or margin areas and features toward centers of pages) of the pages 202*a-c* of the border-intensive electronic document 200 of FIG. 2. The content detector 1116 determines ones of the displayable features to exclude from displaying (block 1404). In the illustrated example, the content detector 1116 uses one or more of image recognition capabilities, blank space detection capabilities, pattern matching capabilities, text recognition capabilities, and/or any other suitable capability to identify displayable features deemed of relatively little or no interest for displaying. For example, in the illustrated example of FIGS. 2 and 8-10, the content detector 1116 determines that displayable features located at the borders 204*a-c* of FIG. 2 (and forming the non-display content portions 804, 904, and 1004 of FIGS. 8-10) should be excluded from display because they are deemed as having little or no meaningfulness relative to contents located within the content portions 806, 906, and 1006 of FIGS. 8-10.

The content detector 1116 determines the content portions for display for each of the pages 202*a-c* (block 1406). In the illustrated example, the content detector 1116 determines that the content portion 806 (FIG. 8) should be displayed when the page 202*a* is active, that the content portion 906 (FIG. 9) should be displayed when the page 202*b* is active, and that the content portion 1006 (FIG. 10) should be displayed when the page 202*c* is active. The zoom controller 1118 (FIG. 11) determines a zoom level to render the content portions 806, 906, and 1006 for each page 202*a-c* (block 1408). For example, if each of the content portions 806, 906, and 1006 has a different dimension, the zoom controller 1118 determines a different zoom level for each of the content portions 806, 906, and 1006. If all the content portions 806, 906, and 1006 have the same dimensions, the zoom controller 1118 determines that the same zoom level should be used for all of the content portions 806, 906, and 1006.

The zoom controller 1118 enlarges an active one of the content portions 806, 906, and 1006 based on its respective zoom level (block 1410). For the active one of the pages 202*a-c*, the display 1108 (FIG. 11) displays a corresponding one of the enlarged content portions 806, 906, and 1006 (block 1412) to fill a display area on the display of the mobile device 300 and to exclude a corresponding one of the non-display content portions 804, 904, and 1004 from the display area. If the application interface 1104 (FIG. 11) determines that another page (e.g., another one of the pages 202*a-c*) should be displayed (block 1414), control returns to block 1410 to display a corresponding one of the enlarged content portions 806, 906, and 1006 for the next page to be displayed. If another page is not to be displayed (block 1414), the application interface 1104 determines whether to end an auto-zoom mode (block 1416). In some examples, a user may exit the auto-zoom mode by de-selecting the auto-zoom mode feature via a graphical user interface menu. If the auto-zoom mode is not to be ended (block 1416), control returns to block 1414. Otherwise, if the auto-zoom mode is to be ended (block 1416), control advances to block 1418.

The application interface 1104 determines whether it should perform the auto-zoom method for a same application or a different application (block 1418). For example, the application interface 1104 may be an operating system-level interface that facilitates performing the example method of FIG. 14 across different applications. In such examples, the application interface 1104 may receive a request from the same application that rendered the border-intensive electronic document 200 to auto-zoom on contents of interest again for another document or from another application to auto-zoom on contents of interest for a document rendered by that application. If requested to perform the auto-zoom method for the same or another application (block 1418), control returns to block 1402. In examples in which another application is requesting the auto-zoom method, the example method of FIG. 14 operates to detect content for display and content to exclude from being displayed for a document of the other application. If the application interface 1104 determines that it should not perform the auto-zoom method again (block 1418), the example method of FIG. 14 ends.

Figure 15:
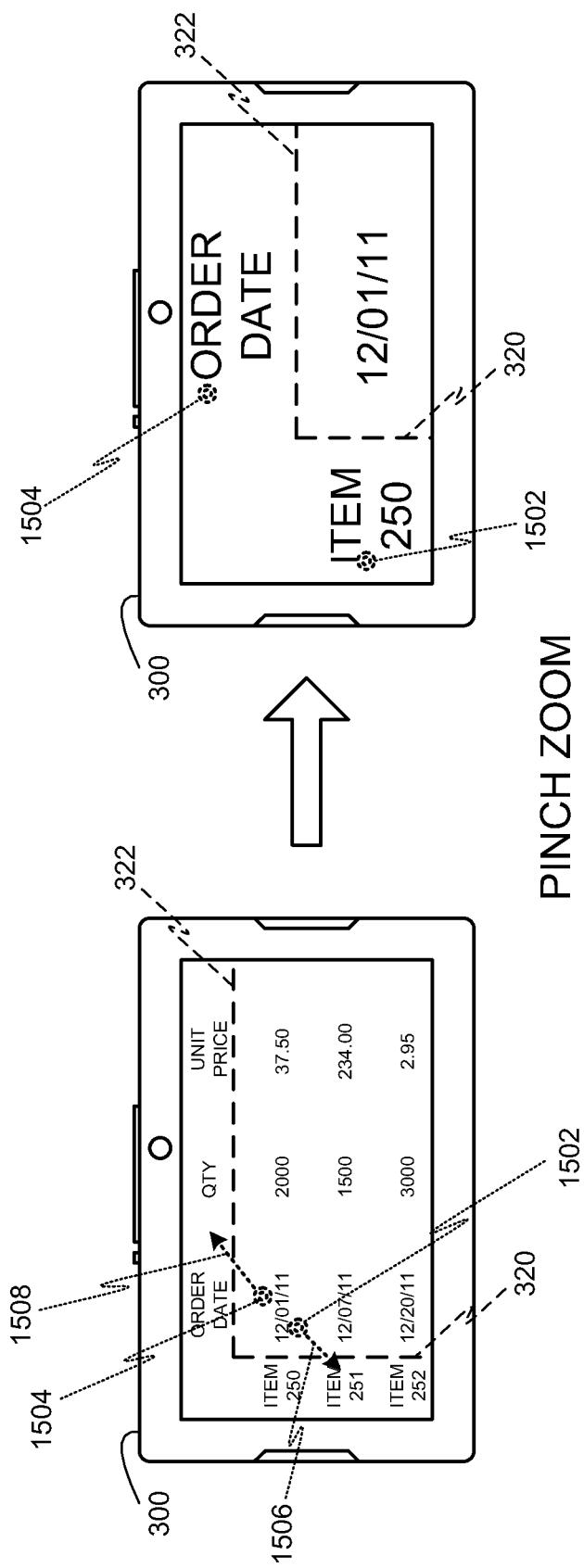
FIG. 15 depicts an example manner of changing zoom levels in connection with the example scroll-intensive electronic document of FIG. 1 displayed on a mobile device.

FIG. 15 illustrates an example zoom feature that operates by zooming in on or out of content in top-side content portion 302 (or its image 314) of FIG. 3 and in left-side content portion 304 (or its image 318) (of FIG. 3) by the same amount as a user specifies to zoom into or out of content in content portion 308 (of FIG. 3). In this manner, the content in the top-side content portion 302 (or its image 314) and in the left-side content portion 304 (or its image 318) are sized (e.g. magnified), in proportion to the zoom level of content in content portion 308. In FIG. 15, a pinch gesture zoom input by a user is first shown by multi-touch display locations 1502 and 1504. When the multi-touch display locations 1502 and 1504 are pulled apart (e.g., as part of a pinch gesture zoom input) as shown generally by arrows 1506 and 1508, the zoom levels of the content in the top-side content portion 302 (or its image 314), the left-side content portion 304 (or its image 318), and the content portion 308, increase at the same rate (or a substantially same rate) and to the same amount (or a substantially same amount). In this manner, the labels of the top-side content portion 302 (or its image 314) and the left-side content portion 304 (or its image 318), and the information in the content portion 308 are magnified by a same amount (or a substantially same amount) (e.g., a 10% increase in zoom level of content in the top-side content portion 302 (or its image 314) and in the left-side content portion 304 (or its image 318), results in a 10% increase in zoom level of content in the content portion 308). In some examples, horizontal demarcation line 322 is accordingly moved by a same amount (or a substantially same amount) (e.g. 10%) to the right. This can allow magnified content in the left-side content portion 304 (or its image 318) to be maintained on the display, and can eliminate a need for the user to scroll the left-side content portion 304 (or its image 318) to view its magnified content. Similarly, in some examples, vertical demarcation line 320 is accordingly moved by a same amount (or a substantially same amount) (e.g. 10%) down. This can allow magnified content in the top-side content portion 302 (or its image 314) to be maintained on the display, and can eliminate a need for the user to scroll the top-side content portion 302 (or its image 314) to view its magnified content. In other examples, the areas of the top-side content portion 302 (or its image 314) and the left-side content portion 304 (or its image 318) are accordingly increased by a same amount (or a substantially same amount) (e.g. 10%), to maintain on the display the magnified content in the top-side content portion 302 (or its image 314) and in the left-side content portion 304 (or its image 318), and eliminate a need for the user to scroll the top-side content portion 302 (or its image 314) or the left-side content portion 304 (or its image 318) to view the magnified content in these content portions. Similarly, if the multi-touch display locations 1502 and 1504 are brought toward one another (e.g., as part of a pinch gesture zoom input), the magnification levels of content in the top-side content portion 302 (or its image 314), content in the left-side content portion 304 (or its image 318), and content in the content portion 308, decrease at the same rate (or a substantially same rate) and to the same amount (or a substantially same amount).

Turning to FIGS. 16A-16F, in some examples, the mobile device 300 is configured to divide its display into display portions, based on one or more user-defined demarcation lines, and directionally certain content portions displayed in the display portions. In these examples, the demarcation lines need not necessarily follow vertical and/or horizontal demarcations. In this manner, users may define demarcation lines that are skewed or angled relative to a vertical alignment and/or a horizontal alignment. Such examples are useful, for example, when displaying scanned documents that appear skewed such that text therein does not follow vertical and/or horizontal alignments. Such examples may also be useful in other applications such as picture viewers/editors.

As shown in FIG. 16A, to define a demarcation line, the mobile device 300 receives two divide inputs 1602 and 1604 from a user corresponding to respective display coordinates. In the illustrated example, the divide inputs are multi-touch gesture inputs from a touch-sensitive display on which a user places two fingers at display locations indicated by the two divide inputs 1602 and 1604. As shown in FIG. 16B, based on the two divide inputs 1602 and 1604, the mobile device 300 defines a demarcation line 1606 passing through the two divide inputs 1602 and 1604 to divide the display into two parts and divide the content into content portions 1608 and 1610.

As shown in FIG. 16C, the content portions 1608 and 1610 are only allowed to scroll in directions parallel to the demarcation line 1606. In the illustrated example, scrolling of the content portion 1608 is directionally locked. In the illustrated example, scrolling of the content portion 1608 parallel to the demarcation line 1606 also results in scrolling of the content portion 1610. Similarly, scrolling of the content portion 1610 parallel to the demarcation line 1606 also results in scrolling of the content portion 1608. However, the content portion 1608 does not scroll when there is scrolling of the content portion 1610 that is perpendicular to the demarcation line 1606. Similarly, the content portion 1610 does not scroll when there is scrolling of the content portion 1608 that is perpendicular to the demarcation line 1606.

In the illustrated example, to define another demarcation line, the mobile device 300 receives another two divide inputs 1612 and 1614 (e.g., multi-touch gesture inputs) from a user corresponding to respective display-coordinates as shown in FIG. 16D. As shown in FIG. 16E, based on the two divide inputs 1612 and 1614, the mobile device 300 divides the display along another demarcation line 1616 passing through the two divide inputs 1612 and 1614. In the illustrated example of FIG. 16F, the demarcation lines 1606 and 1616 intersect to form four display portions in which at least part of content portions 1618, 1620, 1622, and 1624 are displayed and directionally locked. In other examples using multiple demarcation lines, the demarcation lines need not be perpendicular and need not intersect. In the illustrated example, scrolling of the content portion 1618 parallel to the demarcation line 1606 results in corresponding scrolling of the content portion 1622, and scrolling of the content portion 1618 parallel to the demarcation line 1616 results in corresponding scrolling of the content portion 1624. Also in the illustrated example, scrolling of the content portion 1620 parallel to the demarcation line 1606 results in corresponding scrolling of the content portion 1624, and scrolling of the content portion 1620 parallel to the demarcation line 1616 results in corresponding scrolling of the content portion 1622. Also in the illustrated example, scrolling of the content portion 1622 parallel to the demarcation line 1606 also results in corresponding scrolling of the content portion 1618, and scrolling of the content portion 1622 parallel to the demarcation line 1616 also results in corresponding scrolling of the content portion 1620. Also in the illustrated example, scrolling of the content portion 1624 parallel to the demarcation line 1606 results in corresponding scrolling of the content portion 1620, and scrolling of the content portion 1624 parallel to the demarcation line 1616 results in corresponding scrolling of the content portion 1618.

More generally, in the illustrated example, scrolling of one of the content portions 1618, 1620, 1622, and 1624 parallel to one of the demarcation lines 1606 and 1616 also results in a corresponding scrolling of an adjacent one of the content portions 1618, 1620, 1622, and 1624 that is separated by a respective one of the demarcation lines 1606 and 1616, while scrolling perpendicular to one of the demarcation lines 1606 and 1616 results in no scrolling of an adjacent one of the content portions 1618, 1620, 1622, and 1624 that is separated by a respective one of the demarcation lines 1606 and 1616. In some examples, scrolling of a particular one of the content portions 1618, 1620, 1622, and 1624 can optionally be locked from moving in response to scrolling of others of the content portions 1618, 1620, 1622, and 1624. For example, the content portion 1624 may be locked from moving when a user scrolls the contents displayed in the content portions 1618 or 1620. In some examples, rules defining how directionally locked content portions (e.g., the content portions 1618, 1620, 1622, and 1624 in the illustrated example of FIG. 16F) can be extended when more than two demarcation lines (e.g., the demarcation lines 1606 and 1616 in the illustrated example of FIG. 16F) are used to divide the display into multiple display portions.

While creation of a demarcation line at an angle not parallel to a display border is shown using a multi-touch gesture, other approaches are anticipated such as establishing a parallel demarcation line using the afore mentioned tap gesture and then using a drag gesture to modify the location of either or both endpoints of the demarcation line.

Figure 17A:
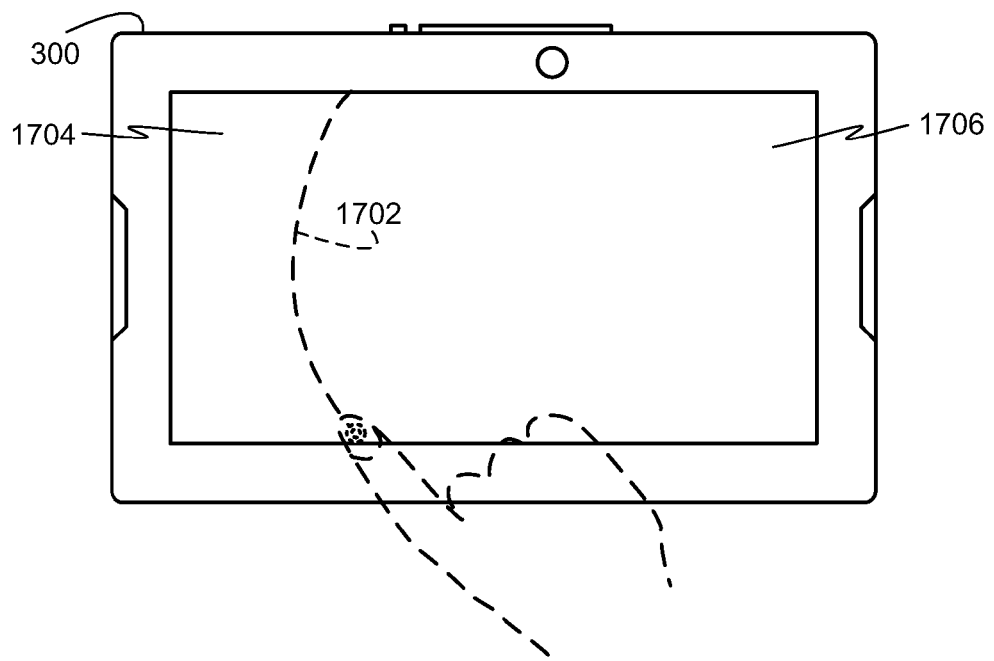
FIGS. 17A and 17B depict example manners of free-forming demarcation lines to divide a display into display portions for displaying one or more directionally locked content portions of content.
Figure 17B:
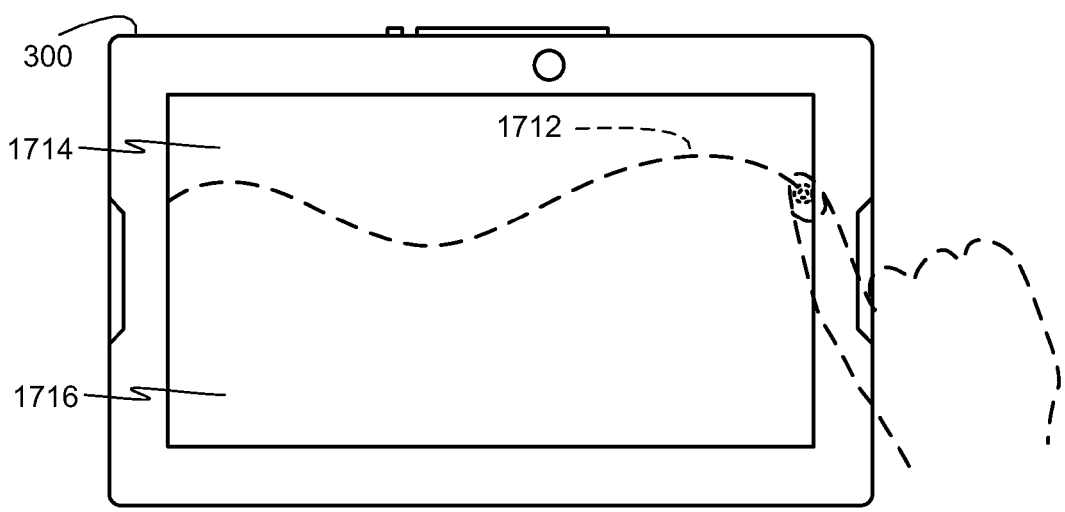

FIGS. 17A and 17B depict example manners of free-forming demarcation lines to divide the display into display portions and display in one or more of those display portions, directionally locked content portions of content. In the illustrated example of FIG. 17A, the mobile device 300 receives a divide input from a user representing a free-formed curved line 1702 that the user generated by dragging a finger on the display of the mobile device 300. In the illustrated example, the mobile device 300 uses the free-formed curved line 1702 to define a demarcation line 1702 to divide a display into display portions and display in one or more of those display portions, directionally locked content portions 1704 and 1706. In the illustrated example of FIG. 17A, the content portion 1704 is directionally locked but scrolls in vertical directions in response to vertical scrolling of the content portion 1706. In some examples, the divide input is a free-formed straight line or line of any shape. In some examples, the mobile device 300 adjusts an angle of a free-formed straight line (or adjusts an angle any of the demarcation lines created, as discussed above with respect to FIGS. 3, 16A-16F), in response to a user input in which the user touches any part of the straight line and dragging his finger to a point on the display where the user wishes to tilt the line and define its angle.

In the illustrated example of FIG. 17B, the mobile device 300 receives a divide input from a user representing a free-formed line 1712 that the user generated by dragging a finger on the display of the mobile device 300. In the illustrated example, the mobile device 300 uses the free-formed line 1712 to define a demarcation line 1712 to divide a display into display portions and display in one or more of those display portions directionally locked content portions 1714 and 1716. In the illustrated example of FIG. 17B, the content portion 1714 is directionally locked but scrolls in horizontal directions in response to horizontal scrolling of the content portion 1716. Although each of FIGS. 17A and 17B shows only one demarcation line 1702 and 1712, in other examples, multiple free-form demarcation lines may be defined based on user divide input to divide a display two or more display portions to display in one or more of those display portions directionally locked content portions of content.

Although certain methods, apparatus, and articles of manufacture have been described herein, the scope of coverage of this patent is not limited thereto. To the contrary, this patent covers all methods, apparatus, and articles of manufacture fairly falling within the scope of the claims either literally or under the doctrine of equivalents.

What is claimed is:

1. A method performed by an electronic device, having a display and a processor controlling an operating system to display content on the display, the content having an area larger than the display, the method comprising:
   receiving a divide input comprising a tap at a display coordinate on the display, to divide the display, wherein the display is a touch screen display;
   determining the display coordinate corresponding to the divide input, the display coordinate indicative of a location of the tap on the display; determining a demarcation line based on the display coordinate; dividing the display into first and second display portions along the demarcation line;
   dividing the content into first and second content portions;
   displaying at least part of the first content portion in the first display portion;
   displaying at least part of the second content portion in the second display potion;
   after receiving a scrolling input, controlling scrolling of the first content portion to allow scrolling only in directions parallel to the first demarcation line; and
   controlling scrolling of the second portion to allow scrolling in multiple directions.

2. A method as defined in claim 1, wherein the demarcation line is independent of feature demarcations native to an electronic document or application displayed in the content.

3. A method as defined in claim 1, wherein the demarcation line has an angle relative to the display that is defined by a user input.

4. A method as defined in claim 1, wherein a displacement of the scrolling of the first content portion is substantially similar to a displacement of the scrolling of the second content portion in directions parallel to the demarcation line.

5. A method as defined in claim 1, wherein the content includes content from either first or second applications and the operating system operates the first application to generate the first content portion at a first time and further operates the second application to generate the second content portion at a second time and wherein the controlled scrolling of both the first and second content portions is substantially controlled by the operating system.

6. A method as defined in claim 1, further comprising:
after receiving a zoom input, magnifying content in the first content portion and the second content portion by a substantially same amount.

7. A method as defined in claim 6, further comprising:
after receiving the zoom input, moving the demarcation line to substantially maintain the first content portion displayed on the display.

8. A method as defined in claim 6, further comprising:
after receiving the zoom input at the first display portion, increasing the second content portion by the substantially same amount.

9. A method as defined in claim 1, further comprising:
further dividing the display into a third display portion along a second demarcation line;
further dividing the content into a third content portion;
displaying at least part of the third content portion in the third display portion; and
after receiving the scrolling input, further controlling scrolling of the third content portion only in directions parallel to the second demarcation line.

10. An electronic device to display content having an area larger than a display of the electronic device, comprising:
the display;
a memory storing an operating system;
a processor, connected to the display and the memory, and to control the operating system to:
receive a divide input comprising a tap at a display coordinate on the display, to divide the display, wherein the display is a touch screen display;
determine the display coordinate corresponding to the divide input, the display coordinate indicative of a location of the tap on the display;
determine a demarcation line based on the display coordinate;
divide the display into first and second display portions along the demarcation line;
divide the content into first and second content portions;
display at least part of the first content portion in the first display portion;
display at least part of the second content portion in the second display potion;
after receiving a scrolling input, controlling scrolling of the first content portion to allow scrolling only in directions parallel to the demarcation line; and
controlling scrolling of the second content portion to allow scrolling in multiple directions.

11. An electronic device as defined in claim 10, wherein the demarcation line is independent of feature demarcations native to an electronic document or application displayed in the content.

12. An electronic device as defined in claim 10, wherein the demarcation line has an angle relative to the display that is defined by a user input.

13. An electronic device as defined in claim 10, wherein a displacement of the scrolling of the first content portion is substantially similar to a displacement of the scrolling of the second content portion in directions parallel to the demarcation line.

14. An electronic device as defined in claim 10, wherein the content includes content from either first or second applications and the operating system operates the first application to generate the first content portion at a first time and further operates the second application to generate the second content portion at a second time and wherein the controlled scrolling of both the first and second content portions is substantially controlled by the operating system.

15. An electronic device as defined in claim 10, wherein the processor is further to control the operating system to, after receiving a zoom input, magnify content in the first content portion and the second content portion by a substantially same amount.

16. An electronic device as defined in claim 15, wherein the processor is further to control the operating system to, after receiving the zoom input, move the demarcation line to substantially maintain the first content portion displayed on the display.

17. An electronic device as defined in claim 15, wherein the processor is further to control the operating system to, after receiving the zoom input at the first display portion, increase the second content portion by the substantially same amount.

18. An electronic device as defined in claim 10, wherein the processor is further to control the operating system to:
further divide the content into a third content portion;
display at least part of the third content portion in the third display portion; and
after receiving the scrolling input, further control scrolling of the third content portion only in directions parallel to the second demarcation line.

19. A tangible computer readable medium comprising instructions that, when executed, cause a machine to at least:
receive a divide input comprising a tap at a display coordinate on a display, to divide the display, wherein the display is a touch screen display;
determine the display coordinate corresponding to the divide input, the display coordinate indicative of a location of the tap on the display;
determine a demarcation line based on the display coordinate;
divide the display into first and second display portions along the demarcation line;
divide content into first and second content portions;
display at least part of the first content portion in the first display portion;
display at least part of the second content portion in the second display potion;
after receiving a scrolling input, control scrolling of the first content portion to allow scrolling only in directions parallel to the first demarcation line; and
control scrolling of the second portion to allow scrolling in multiple directions.

20. A tangible computer readable medium as defined in claim 19, wherein the demarcation line is independent of feature demarcations native to an electronic document or application displayed in the content.

21. A tangible computer readable medium as defined in claim 19, wherein the demarcation line has an angle relative to the display that is defined by a user input.

22. A tangible computer readable medium as defined in claim 19, wherein a displacement of the scrolling of the first content portion is substantially similar to a displacement of the scrolling of the second content portion in directions parallel to the demarcation line.

23. A tangible computer readable medium as defined in claim 19, wherein the content includes content from either first or second applications and the instructions are further to cause the machine to operate the first application to generate the first content portion at a first time and further operates the second application to generate the second content portion at a second time and wherein the controlled scrolling of both the first and second content portions is substantially controlled by an operating system.

24. A tangible computer readable medium as defined in claim 19, wherein the instructions are to further cause the machine to, after receiving a zoom input, magnify content in the first content portion and the second content portion by a substantially same amount.

25. A tangible computer readable medium as defined in claim 24, wherein the instructions are to further cause the machine to, after receiving the zoom input, move the demarcation line to substantially maintain the first content portion displayed on the display.

26. A tangible computer readable medium as defined in claim 24, wherein the instructions are to further cause the machine to, after receiving the zoom input at the first display portion, increase the second content portion by the substantially same amount.

27. A tangible computer readable medium as defined in claim 19, wherein the instructions are to further cause the machine to:
- further divide the display into a third display portion along a second demarcation line;
- further divide the content into a third content portion;
- display at least part of the third content portion in the third display portion; and
- after receiving the scrolling input, further control scrolling of the third content portion only in directions parallel to the second demarcation line.

* * * * *